US007649954B2

(12) United States Patent
Walton et al.

(10) Patent No.: US 7,649,954 B2
(45) Date of Patent: *Jan. 19, 2010

(54) METHOD AND APPARATUS FOR PROCESSING DATA FOR TRANSMISSION IN A MULTI-CHANNEL COMMUNICATION SYSTEM USING SELECTIVE CHANNEL INVERSION

(75) Inventors: Jay R. Walton, Westford, MA (US); John W. Ketchum, Harvard, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/478,878

(22) Filed: Jun. 30, 2006

(65) Prior Publication Data

US 2006/0291582 A1   Dec. 28, 2006

Related U.S. Application Data

(63) Continuation of application No. 09/881,610, filed on Jun. 14, 2001, now Pat. No. 7,072,413, which is a continuation-in-part of application No. 09/860,274, filed on May 17, 2001.

(51) Int. Cl.
*H04L 1/02* (2006.01)

(52) U.S. Cl. .................. 375/267; 375/146; 375/299; 370/204; 370/465; 370/480; 455/13.4; 455/102

(58) Field of Classification Search ............... 375/140, 375/141, 146, 260, 261, 267, 295, 299, 203, 375/204, 318, 464, 465, 480; 455/13.4, 102, 455/103, 115
See application file for complete search history.

(56) References Cited

U.S. PATENT DOCUMENTS 4,438,511 A   3/1984   Baran (Continued)

FOREIGN PATENT DOCUMENTS

JP   08274687   10/1996

(Continued)

OTHER PUBLICATIONS

Fuyun Ling. "Optimal Reception, Performance Bound, and Cuttoff-Rate Analysis of References-Assisted Coherent CDMA Communications with Application," IEEE Transaction on Communications, vol. 47, No. 10, Oct. 1999 (pp. 1583-1592).

(Continued)

*Primary Examiner*—Dac V Ha
(74) *Attorney, Agent, or Firm*—Dmitry R. Milikovsky; Ross L. Franks

(57) ABSTRACT

Techniques to process data for transmission over multiple transmission channels. The available transmission channels are segregated into one or more groups, and the channels in each group are selected for use for data transmission. Data for each group is coded and modulated based on a particular coding and modulation scheme to provide modulation symbols, and the modulation symbols for each selected channel are weighted based on an assigned weight. The weighting "inverts" the selected channels such that they achieve similar received SNRs. With selective channel inversion, only "good" channels in each group having SNRs at or above a particular threshold are selected, "bad" channels are not used, and the total available transmit power for the group is distributed across the good channels in the group. Improved performance is achieved by using only good channels in each group and matching each selected channel's received SNR to the required SNR.

45 Claims, 10 Drawing Sheets

U.S. PATENT DOCUMENTS

| | | | |
|---|---|---|---|
| 4,679,227 A | 7/1987 | Hughes-Hartogs | |
| 4,710,944 A | 12/1987 | Nossen | |
| 5,056,109 A | 10/1991 | Gilhousen et al. | |
| 5,210,771 A | 5/1993 | Schaeffer et al. | |
| 5,265,119 A | 11/1993 | Gilhousen et al. | |
| 5,406,593 A | 4/1995 | Chennakeshu et al. | |
| 5,479,447 A | 12/1995 | Chow et al. | |
| 5,592,490 A | 1/1997 | Barratt et al. | |
| 5,625,876 A | 4/1997 | Gilhousen et al. | |
| 5,649,287 A | 7/1997 | Forssen et al. | |
| 5,784,363 A | 7/1998 | Engstrom et al. | |
| 5,799,005 A | 8/1998 | Soliman et al. | |
| 5,903,554 A | 5/1999 | Saints | |
| 5,991,284 A | 11/1999 | Willenegger et al. | |
| 6,005,893 A | 12/1999 | Hyll | |
| 6,038,450 A | 3/2000 | Brink et al. | |
| 6,097,972 A | 8/2000 | Saints et al. | |
| 6,144,646 A | 11/2000 | Bohlmann | |
| 6,144,711 A | 11/2000 | Raleigh et al. | |
| 6,167,031 A | 12/2000 | Olofsson et al. | |
| 6,205,190 B1 | 3/2001 | Antonio et al. | |
| 6,205,410 B1 | 3/2001 | Cal | |
| 6,215,827 B1 | 4/2001 | Balachandran et al. | |
| 6,249,543 B1 | 6/2001 | Chow et al. | |
| 6,377,631 B1 * | 4/2002 | Raleigh | 375/299 |
| 6,442,151 B1 | 8/2002 | H'mimy et al. | |
| 6,442,214 B1 | 8/2002 | Boleskei et al. | |
| 6,574,211 B2 | 6/2003 | Padovani et al. | |
| 6,694,155 B1 * | 2/2004 | Chin et al. | 455/562.1 |
| 6,738,443 B1 | 5/2004 | Böhnke et al. | |
| 6,751,187 B2 | 6/2004 | Walton et al. | |
| 6,771,706 B2 | 8/2004 | Ling et al. | |
| 6,785,341 B2 | 8/2004 | Walton et al. | |
| 6,821,535 B2 | 11/2004 | Nurmi et al. | |
| 6,859,503 B2 | 2/2005 | Pautler et al. | |
| 6,961,388 B2 | 11/2005 | Ling et al. | |
| 6,996,080 B1 | 2/2006 | Orr | |
| 7,027,523 B2 | 4/2006 | Jalali | |
| 7,072,413 B2 | 7/2006 | Walton et al. | |
| 7,075,998 B1 | 7/2006 | Rezani et al. | |
| 7,146,172 B2 * | 12/2006 | Li et al. | 455/452.1 |
| 7,164,725 B2 * | 1/2007 | Frank | 375/267 |
| 7,191,381 B2 * | 3/2007 | Gesbert et al. | 714/759 |
| D549,617 S | 8/2007 | Robb | |
| 2002/0118781 A1 | 8/2002 | Thomas et al. | |
| 2002/0154705 A1 | 10/2002 | Walton et al. | |
| 2003/0043928 A1 | 3/2003 | Fing et al. | |
| 2003/0048856 A1 | 3/2003 | Ketchum et al. | |
| 2003/0112880 A1 | 6/2003 | Walton et al. | |
| 2003/0169681 A1 | 9/2003 | Li et al. | |
| 2007/0133708 A1 * | 6/2007 | Lee et al. | |

FOREIGN PATENT DOCUMENTS

| | | |
|---|---|---|
| JP | 10247955 | 9/1998 |
| JP | 11068696 | 3/1999 |
| JP | 11355373 | 12/1999 |
| KR | 1019990070745 | 9/1999 |
| WO | 98000928 | 1/1998 |
| WO | 9809381 A | 3/1998 |
| WO | 9940689 | 8/1999 |
| WO | 99063713 | 12/1999 |
| WO | 0038351 | 6/2000 |
| WO | 0101722 | 1/2001 |
| WO | 0203557 A | 1/2002 |

OTHER PUBLICATIONS

John A.C. Bingham, "Multicarrier Modulation for Data Transmission: An Idea Whose Time Has Come," IEEE Communication Magazine.

Catreux, S. Drissen, P.F. Greenstein, L.J., Simulation results for an interference-limited multiple input multiple output cellular system, in Global Telecommunications Conference, 2000. Globecome '00. IEEE, USA, Dec. 1, 2000, vol. 2, On pp. 1094-1096.

1998 The Institute of Electronics, Information and Communication Engineers, Lecture Papers, Spatial Division Multiplex Transmission Scheme Using OFDM by Minoru Okada, Shozo Komaki, Mar. 6, 1998, p. 378, Communication 1-B-5-14.

International Search Report, PCT/US02/015404, International Search Authority—European Patent Office, Nov. 28, 2002.

International Search Report, PCT/US02/018961, International Search Authority—European Patent Office, Sep. 12, 2002.

International Search Report, PCT/US02/020379, International Search Authority—European Patent Office, May 9, 2002.

International Preliminary Examination Report, PCT/US2002/015404, International Preliminary Examination Report, United States, Nov. 17, 2003.

International Preliminary Examination Report, PCT/US2002/018961, International Preliminary Examination Report, United States, Mar. 11, 2003.

Eurpean Search Report - EP09152606 - Search Authority - The Hague - Mar. 18, 2009.

Yih et al, "Adaptive Modulation, Power Allocation and Control for OFDM Wireless Networks", Personal, Indoor and Mobile Radio Communications, 2000. PIMRC 2000, The 11th IEEE International Symposium on Sep. 18-21, 2000, Piscataway, NJ, USA, IEEE, vol. 2, September 18, 2000 (Sep. 18, 2000), pp. 809-813.

\* cited by examiner

METHOD AND APPARATUS FOR PROCESSING DATA FOR TRANSMISSION IN A MULTI-CHANNEL COMMUNICATION SYSTEM USING SELECTIVE CHANNEL INVERSION

CLAIM OF PRIORITY UNDER 35 U.S.C. §120

This application is a continuation of U.S. application Ser. No. 09/881,610, filed Jun. 14, 2001, now U.S. Pat. 7,072,413 entitled "Method and Apparatus for Processing Data for Transmission in a Multi-Channel Communication System Using Selective Channel Inversion," which is a continuation-in-part of U.S. application Ser. No. 09/860,274, filed May 17, 2001, entitled "Method and Apparatus for Processing Data for Transmission in a Multi-Channel Communication System using Selective Channel Inversion," which are assigned to the assignee hereof and hereby expressly incorporated by reference herein.

BACKGROUND

1. Field

The present invention relates generally to data communication, and more specifically to a novel and improved method and apparatus for processing data for transmission in a wireless communication system using selective channel inversion.

2. Background

A multi-channel communication system is often deployed to provide increased transmission capacity for various types of communication such as voice, data, and so on. Such a multi-channel system may be a multiple-input multiple-output (MIMO) communication system, an orthogonal frequency division modulation (OFDM) system, a MIMO system that utilizes OFDM, or some other type of system. A MIMO system employs multiple transmit antennas and multiple receive antennas to exploit spatial diversity to support a number of spatial subchannels, each of which may be used to transmit data. An OFDM system effectively partitions the operating frequency band into a number of frequency subchannels (or frequency bins), each of which is associated with a respective subcarrier on which data may be modulated. A multi-channel communication system thus supports a number of "transmission" channels, each of which may correspond to a spatial subchannel in a MIMO system, a frequency subchannel in an OFDM system, or a spatial subchannel of a frequency subchannel in a MIMO system that utilizes OFDM.

The transmission channels of a multi-channel communication system typically experience different link conditions (e.g., due to different fading and multipath effects) and may achieve different signal-to-noise-plus-interference ratios (SNRs). Consequently, the transmission capacities (i.e., the information bit rates) that may be supported by the transmission channels for a particular level of performance may be different from channel to channel. Moreover, the link conditions typically vary over time. As a result, the bit rates supported by the transmission channels also vary with time.

The different transmission capacities of the transmission channels plus the time-variant nature of these capacities make it challenging to provide an effective coding and modulation scheme capable of processing data prior to transmission on the channels. Moreover, for practical considerations, the coding and modulation scheme should be simple to implement and utilize at both the transmitter and receiver systems.

There is therefore a need in the art for techniques to effectively and efficiently process data for transmission on multiple transmission channels with different capacities.

SUMMARY

Aspects of the invention provide techniques to process data for transmission over multiple transmission channels selected from among all available transmission channels. The available transmission channels (e.g., the spatial subchannels and frequency subchannels in a MIMO system that utilizes OFDM) are segregated into one or more groups, with each group including any number of transmission channels. In an aspect, the data processing includes coding and modulating data for each group based on a common coding and modulation scheme selected for that group to provide modulation symbols and weighting the modulation symbols for each selected transmission channel based on a weight assigned to the channel. The weighting effectively "inverts" the selected transmission channels in each group such that these channels achieve approximately similar received signal-to-noise-plus-interference ratios (SNRs).

In one embodiment, which is referred to as selective channel inversion (SCI), only "good" transmission channels in each group having SNRs (or power gains) at or above a particular (SNR or power gain) threshold are selected for use for data transmission, and "bad" transmission channels are not used. With selective channel inversion, the total available transmit power for each group is distributed (unevenly) across the good transmission channels, and improved efficiency and performance are achieved. In another embodiment, all available transmission channels in each group are selected for use and the channel inversion is performed for all available channels in the group.

Each group of transmission channels may be associated with (1) a respective (SNR or power gain) threshold used to select transmission channels for use for data transmission and (2) a respective coding and modulation scheme used to code and modulate the data for the group. For a MIMO system that utilizes OFDM, each group may correspond to a respective transmit antenna, and the transmission channels in each group may be the frequency subchannels for the corresponding transmit antenna.

The channel inversion techniques simplify the coding/modulation at a transmitter system and the decoding/demodulation at a receiver system. Moreover, the selective channel inversion technique may also provide improved performance due to the combined benefits of (1) using only the $N_S$ best transmission channels in each group selected from among all available transmission channels in the group and (2) matching the received SNR of each selected transmission channel to the SNR required by the coding and modulation scheme used for the group in which the channel belongs.

The invention further provides methods, systems, and apparatus that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Various aspects, embodiments, and features of the invention may be applied to any multi-channel communication system in which multiple transmission channels are available for data transmission. Such multi-channel communication systems include multiple-input multiple-output (MIMO) systems, orthogonal frequency division modulation (OFDM) systems, MIMO systems that utilize OFDM, and others. The multi-channel communication systems may also implement code division multiple access (CDMA), time division multiple access (TDMA), frequency division multiple access (FDMA), or some other multiple access techniques. Multiple access communication systems can support concurrent communication with a number of terminals (i.e., users).

Figure 1:
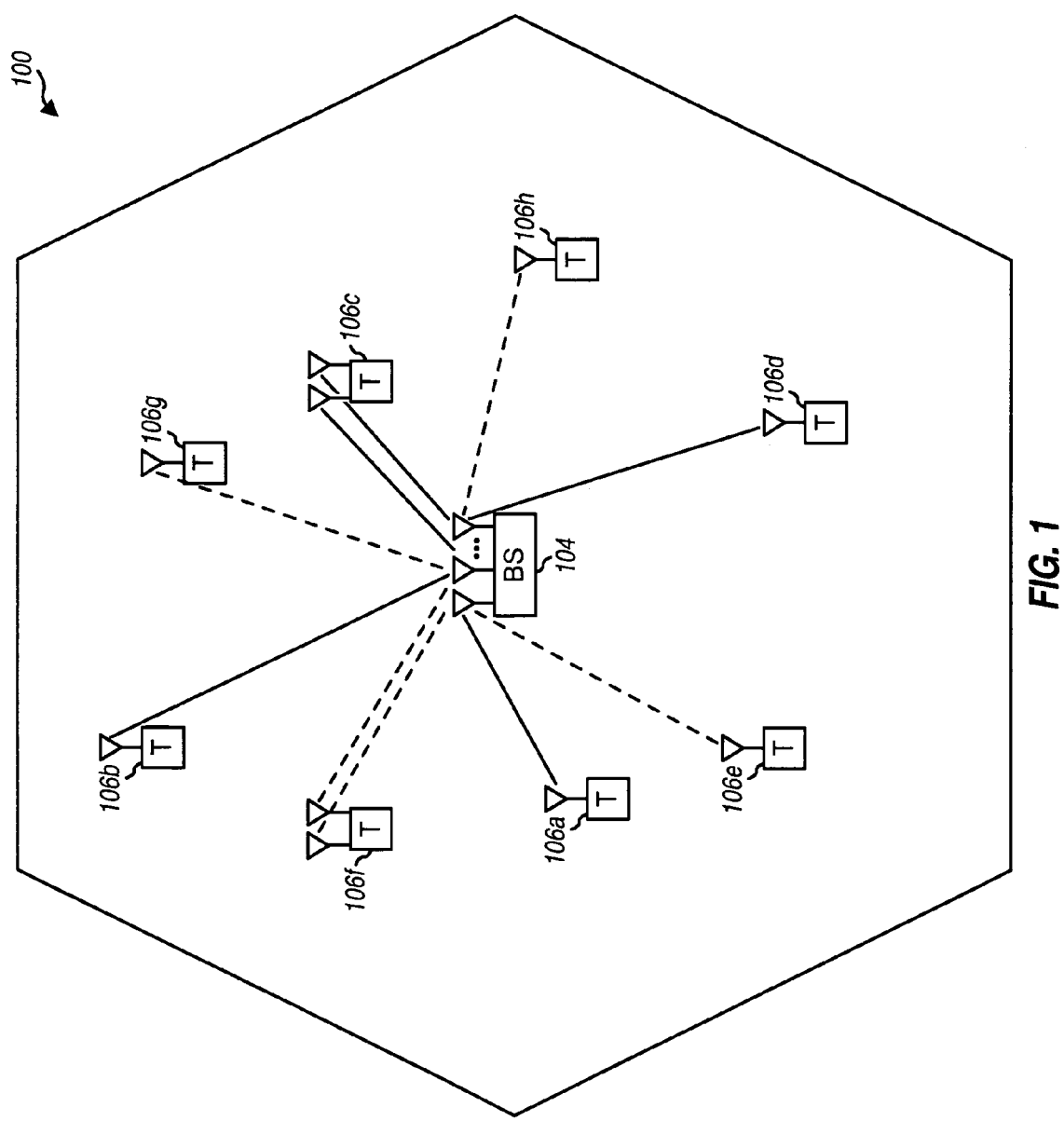
FIG. 1 is a diagram of a multiple-input multiple-output (MIMO) communication system that may be designed and operated to implement various aspects and embodiments of the invention.

FIG. 1 is a diagram of a multiple-input multiple-output (MIMO) communication system 100 that may be designed and operated to implement various aspects and embodiments of the invention. MIMO system 100 employs multiple ($N_T$) transmit antennas and multiple ($N_R$) receive antennas for data transmission. MIMO system 100 is effectively formed for a multiple access communication system having a base station (BS) 104 that concurrently communicates with a number of terminals (T) 106. In this case, base station 104 employs multiple antennas and represents the multiple-input (MI) for uplink transmissions and the multiple-output (MO) for downlink transmissions. The downlink (i.e., forward link) refers to transmissions from the base station to the terminals, and the uplink (i.e., reverse link) refers to transmissions from the terminals to the base station.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_C$ independent channels, with $N_C \leq \min\{N_T, N_R\}$. Each of the $N_C$ independent channels is also referred to as a spatial subchannel of the MIMO channel and corresponds to a dimension. In one common MIMO system implementation, the $N_T$ transmit antennas are located at and associated with a single transmitter system, and the $N_R$ receive antennas are similarly located at and associated with a single receiver system. A MIMO system may also be effectively formed for a multiple access communication system having a base station that concurrently communicates with a number of terminals. In this case, the base station is equipped with a number of antennas and each terminal may be equipped with one or more antennas.

An OFDM system effectively partitions the operating frequency band into a number of ($N_F$) frequency subchannels (i.e., frequency bins or subbands). At each time slot, a modulation symbol may be transmitted on each of the $N_F$ frequency subchannels. Each time slot corresponds to a particular time interval that may be dependent on the bandwidth of the frequency subchannel.

A multi-channel communication system may be operated to transmit data via a number of transmission channels. For a MIMO system not utilizing OFDM, there is typically only one frequency subchannel and each spatial subchannel may be referred to as a transmission channel. For a MIMO system utilizing OFDM, each spatial subchannel of each frequency subchannel may be referred to as a transmission channel. And for an OFDM system not utilizing MIMO, there is only one spatial subchannel for each frequency subchannel and each frequency subchannel may be referred to as a transmission channel.

The transmission channels in a multi-channel communication system typically experience different link conditions (e.g., due to different fading and multipath effects) and may achieve different signal-to-noise-plus-interference ratios (SNRs). Consequently, the capacity of the transmission channels may be different from channel to channel. This capacity may be quantified by the information bit rate (i.e., the number of information bits per modulation symbol) that may be transmitted on a transmission channel for a particular level of performance (e.g., a particular bit error rate (BER) or packet error rate (PER)). Since the link conditions typically vary with time, the supported information bit rates for the transmission channels also vary with time.

To more fully utilize the capacity of the transmission channels, channel state information (CSI) descriptive of the link conditions may be determined (typically at the receiver system) and provided to the transmitter system. The transmitter system may then process (e.g., encode, modulate, and weight) data such that the transmitted information bit rate for each transmission channel matches the transmission capacity of the channel. CSI may be categorized as either "full CSI" or "partial CSI". Full CSI includes sufficient characterization (e.g., the amplitude and phase) across the entire system bandwidth for the propagation path between each transmit-receive antenna pair in a $N_T \times N_R$ MIMO matrix (i.e., the characterization for each transmission channel). Partial CSI may include, for example, the SNRs of the transmission channels.

Various techniques may be used to process data prior to transmission over multiple transmission channels. In one technique, data for each transmission channel may be coded and modulated based on a particular coding and modulation scheme selected for that channel based on the channel's CSI. By coding and modulating separately for each transmission channel, the coding and modulation may be optimized for the SNR achieved by each channel. In one implementation of such a technique, a fixed base code is used to encode data, and the coded bits for each transmission channel are then punctured (i.e., selectively deleted) to obtain a code rate supported by that channel. In this implementation, the modulation scheme for each transmission channel is also selected based on the channel's code rate and SNR. This coding and modulation scheme is described in further detail in U.S. patent application Ser. No. 09/776,075, entitled "CODING SCHEME FOR A WIRELESS COMMUNICATION SYSTEM," filed Feb. 1, 2001, assigned to the assignee of the present application and incorporated herein by reference. For this technique, substantial implementation complexity is typically associated with having a different code rate and modulation scheme for each transmission channel.

In accordance with an aspect of the invention, techniques are provided to (1) process data for all selected transmission channels based on a common coding and modulation scheme to provide modulation symbols, and (2) weight the modulation symbols for each selected transmission channel based on the channel's CSI. The weighting effectively "inverts" the selected transmission channels such that, in general, the SNRs are approximately similar at the receiver system for all selected transmission channels. In one embodiment, which is referred to as selective channel inversion (SCI), only "good" transmission channels having SNRs (or power gains) at or above a particular SNR (or power gain) threshold are selected for use for data transmission, and "bad" transmission channels are not used. With selective channel inversion, the total available transmit power is distributed across the good transmission channels, and improved efficiency and performance are achieved. In another embodiment, all available transmission channels are selected for use and the channel inversion is performed for all transmission channels.

In yet another embodiment, the available transmission channels are segregated into groups and the selective channel inversion is applied independently to each group of channels. For example, the frequency subchannels of each transmit antenna may be grouped together, and the selective channel inversion may be applied independently for each of the transmit antennas. This segregation permits the optimization to be achieved on a per group (e.g., per transmit antenna) basis.

These channel inversion techniques may be advantageously used when full or partial CSI is available at the transmitter. These techniques ameliorate most of the complexity associated with the channel-specific coding and modulation technique described above, while still achieving high performance. Moreover, the selective channel inversion technique may also provide improved performance over the channel-specific coding and modulation technique due to the combined benefits of (1) using only the $N_S$ best transmission channels from among the available transmission channels and (2) matching the received SNR of each selected transmission channel to the SNR required for the selected coding and modulation scheme.

For a MIMO system utilizing OFDM and having full CSI available, the transmitter system may have knowledge of the complex-valued gain of the transmission path between each transmit-receive antenna pair of each frequency subchannel. This information may be used to render the MIMO channel orthogonal so that each eigenmode (i.e., spatial subchannel) may be used for an independent data stream.

For a MIMO system utilizing OFDM and having partial CSI available, the transmitter may have limited knowledge of the transmission channels. Independent data streams may be transmitted on corresponding transmission channels over the available transmit antennas, and the receiver system may use a particular linear (spatial) or non-linear (space-time) processing technique (i.e., equalization) to separate out the data streams. The equalization provides an independent data stream corresponding to each transmission channel (e.g., each transmit antenna and/or each frequency subchannel), and each of these data streams has an associated SNR.

If the set of SNRs for the transmission channels is available at the transmitter system, this information may be used to select the proper coding and modulation scheme and to distribute the total available transmit power for each group (there may be only one group). In an embodiment, the available transmission channels in each group are ranked in order of decreasing received SNR, and the total available transmit power is allocated to and used for the $N_S$ best transmission channels in the group. In an embodiment, transmission channels having received SNRs that fall below a particular SNR threshold are not selected for use. The SNR threshold may be selected to optimize throughput or some other criteria. The total available transmit power for each group is distributed across all transmission channels in the group selected for use such that the transmitted data streams have approximately similar received SNRs at the receiver system. Similar processing may be performed if the channel gains are available at the transmitter system. In an embodiment, a common coding scheme (e.g., a particular Turbo code of a particular code rate) and a common modulation scheme (e.g., a particular PSK or QAM constellation) are used for all selected transmission channels in each group.

Transmission Channel Inversion

If a simple (common) coding and modulation scheme can be used at the transmitter system, then a single (e.g., convolutional or Turbo) coder and code rate may be used to encode data for all transmission channels selected for data transmission, and the resultant coded bits may be mapped to modulation symbols using a single (e.g., PSK or QAM) modulation scheme. The resultant modulation symbols are then all drawn from the same "alphabet" of possible modulation symbols and encoded with the same code and code rate. This would then simplify the data processing at both the transmitter and receiver.

However, the transmission channels in a multi-channel communication system typically experience different link conditions and achieve different SNRs. In this case, if the same amount of transmit power is used for each selected transmission channel, then the transmitted modulation symbols will be received at different SNRs depending on the specific channels on which the modulation symbols are transmitted. The result may be a large variation in symbol error probability over the set of selected transmission channels, and an associated loss in bandwidth efficiency.

In accordance with an aspect of the invention, a power control mechanism is used to set or adjust the transmit power level for each transmission channel selected for data transmission to achieve a particular SNR at the receiver system. By achieving similar received SNRs for all selected transmission channels, a single coding and modulation scheme may be used for all selected transmission channels, which can greatly reduce the complexity of the coding/modulation process at the transmitter system and the complementary demodulation/decoding process at the receiver system. The power control may be achieved by "inverting" the selected transmission channels and properly distributing the total available transmit power across all selected channels, as described in further detail below.

If the same amount of transmit power is used for all available transmission channels in a MIMO system utilizing OFDM, then the received power for a particular channel may be expressed as:

$$P'_{rx}(j, k) = \frac{P_{tx}}{N_T N_F} |H(j, k)|^2 \qquad \text{Eq (1)}$$

where
- $P_{rx}'(j,k)$ is the received power for transmission channel (j,k) (i.e., the j-th spatial subchannel of the k-th frequency subchannel),
- $P_{tx}$ is the total transmit power available at the transmitter,
- $N_T$ is the number of transmit antennas,
- $N_F$ is the number of frequency subchannels, and
- $H(j,k)$ is the complex-valued "effective" channel gain from the transmitter to the receiver for transmission channel (j,k).

For simplicity, the channel gain $H(j,k)$ includes the effects of the processing at the transmitter and receiver. Also for simplicity, it is assumed that the number of spatial subchannels is equal to the number of transmit antennas and $N_T \cdot N_F$ represents the total number of available transmission channels. If the same amount of power is transmitted for each available transmission channel, the total received power $P_{rx\_total}$ for all available transmission channels may be expressed as:

$$P_{rx\_total} = \sum_{j=1}^{N_T} \sum_{k=1}^{N_F} \frac{P_{tx}}{N_T N_F} |H(j,k)|^2. \quad \text{Eq (2)}$$

Equation (1) shows that the receive power for each transmission channel is dependent on the power gain of that channel, i.e., $|H(j,k)|^2$. To achieve equal received power across all available transmission channels, the modulation symbols for each channel can be weighted at the transmitter by a weight of $W(j,k)$, which can be expressed as:

$$W(j,k) = \frac{c}{|H(j,k)|}, \quad \text{Eq (3)}$$

where c is a factor chosen such that the received powers for all transmission channels are approximately equal at the receiver. As shown in equation (3), the weight for each transmission channel is inversely proportional to that channel's gain. The weighted transmit power for transmission channel (j,k) can then be expressed as:

$$P_{tx}(j,k) = \frac{bP_{tx}}{|H(j,k)|^2}, \quad \text{Eq (4)}$$

where b is a "normalization" factor used to distribute the total transmit power among the available transmission channels. This normalization factor b can be expressed as:

$$b = \frac{1}{\sum_{j=1}^{N_T} \sum_{k=1}^{N_F} |H(j,k)|^{-2}}, \quad \text{Eq (5)}$$

where $c^2 = b$. As shown in equation (5), the normalization factor b is computed as the sum of the reciprocal power gains for all available transmission channels.

The weighting of the modulation symbols for each transmission channel by $W(j,k)$ effectively "inverts" the transmission channel. This channel inversion results in the amount of transmit power for each transmission channel being inversely proportional to the channel's power gain, as shown in equation (4), which then provides a particular received power at the receiver. The total available transmit power is thus effectively distributed (unevenly) to all available transmission channels based on their channel gains such that all transmission channels have approximately equal received power, which may be expressed as:

$$P_{rx}(j,k) = bP_{tx}. \quad \text{Eq (6)}$$

If the noise variance is the same across all transmission channels, then the equal received power allows the modulation symbols for all channels to be generated based on a single common coding and modulation scheme, which then greatly simplify the coding and decoding processes.

If all available transmission channels are used for data transmission regardless of their channel gains, then the poor transmission channels are allocated more of the total transmit power. In fact, to achieve similar received power for all transmission channels, the poorer a transmission channel gets the more transmit power needs to be allocated to this channel. When one or more transmission channels become excessively poor, the amount of transmit power needed for these channels would deprive (or starve) the good channels of power, which may then dramatically decrease the overall system throughput.

Selective Channel Inversion Based on Channel Gains

In an aspect, the channel inversion is applied selectively, and only transmission channels whose received power is at or above a particular threshold, $\alpha$, relative to the total received power are selected for data transmission. Transmission channels whose received power falls below this threshold are erased (i.e., not used). For each selected transmission channel, the modulation symbols are weighted at the transmitter such that all selected transmission channels are received at approximately similar power level. The threshold can be selected to maximize throughput or based on some other criteria. The selective channel inversion scheme preserves most of the simplicity inherent in using a common coding and modulation scheme for all transmission channels while also provides high performance normally associated with individual coding per transmission channel.

Initially, the average power gain, $L_{ave}$, is computed for all available transmission channels and can be expressed as:

$$L_{ave} = \frac{\sum_{j=1}^{N_T} \sum_{k=1}^{N_F} |H(j,k)|^2}{N_T N_F}. \quad \text{Eq (7)}$$

The modulation symbols for each selected transmission channel can be weighted at the transmitter by a weight of $\tilde{W}(j,k)$, which can be expressed as:

$$\tilde{W}(j,k) = \frac{\tilde{c}}{|H(j,k)|}. \quad \text{Eq (8)}$$

The weight for each selected transmission channel is inversely proportional to that channel's gain and is determined such that all selected transmission channels are received at approximately equal power. The weighted transmit power for each transmission channel can then be expressed as:

$$P_{tx}(j,k) = \begin{cases} \dfrac{\tilde{b} P_{tx}}{|H(j,k)|^2}, & |H(j,k)|^2 \geq \alpha L_{ave} \\ 0, & \text{otherwise} \end{cases} \quad \text{Eq (9)}$$

where $\alpha$ is the threshold and $\tilde{b}$ is a normalization factor used to distribute the total transmit power among the selected transmission channels. As shown in equation (9), a transmission channel is selected for use if its power gain is greater than or equal to a power gain threshold (i.e., $|H(j,k)|^2 \geq \alpha L_{ave}$) The normalization factor $\tilde{b}$ is computed based on only the selected transmission channels and can be expressed as:

$$\tilde{b} = \dfrac{1}{\sum\limits_{|H(j,k)|^2 \geq \alpha L_{ave}} |H(j,k)|^{-2}}. \quad \text{Eq (10)}$$

Equations (7) through (10) effectively distribute the total transmit power to the selected transmission channels based on their power gains such that all selected transmission channels have approximately equal received power, which may be expressed as:

$$P_{rx}(j,k) = \begin{cases} \tilde{b} P_{tx}, & |H(j,k)|^2 \geq \alpha L_{ave} \\ 0, & \text{otherwise} \end{cases}. \quad \text{Eq (11)}$$

Selective Channel Inversion Based on Channel SNRs

In many communication systems, the known quantities at the receiver system are the received SNRs for the transmission channels rather than the channel gains (i.e., the path losses). In such systems, the selective channel inversion technique can be readily modified to operate based on the received SNRs instead of the channel gains.

If equal transmit power is used for all available transmission channels and the noise variance, $\sigma^2$, is constant for all channels, then the received SNR, $\gamma(j,k)$, for transmission channel (j,k) can be expressed as:

$$\gamma(j,k) = \dfrac{P_{rx}(j,k)}{\sigma^2} = \dfrac{P_{tx}}{\sigma^2 N_T N_F} |H(j,k)|^2. \quad \text{Eq (12)}$$

The average received SNR, $\gamma_{ave}$, for each available transmission channel may be expressed as:

$$\gamma_{ave} = \dfrac{P_{tx}}{\sigma^2 (N_T N_F)^2} \sum_{j=1}^{N_T} \sum_{k=1}^{N_F} |H(j,k)|^2, \quad \text{Eq (13)}$$

which also assumes equal transmit power over the available transmission channels. The received SNR, $\gamma_{total}$, for all available transmission channels may be expressed as:

$$\gamma_{total} = \dfrac{P_{tx}}{\sigma^2} L_{ave} = \dfrac{P_{tx}}{\sigma^2 N_T N_F} \sum_{j=1}^{N_T} \sum_{k=1}^{N_F} |H(j,k)|^2. \quad \text{Eq (14)}$$

The total received SNR, $\gamma_{total}$, is based on the total transmit power being equally distributed across all available transmission channels.

A normalization factor, $\beta$, used to distribute the total transmit power among the selected transmission channels can be expressed as:

$$\beta = \dfrac{1}{\sum\limits_{\gamma(j,k) \geq \alpha \gamma_{ave}} \gamma(j,k)^{-1}}. \quad \text{Eq (15)}$$

As shown in equation (15), the normalization factor $\beta$ is computed based on, and as the sum of the reciprocal of, the SNRs of all selected transmission channels.

To achieve similar received SNR for all selected transmission channels, the modulation symbols for each selected transmission channel (j,k) may be weighted by a weight that is related to that channel's SNR, which may be expressed as:

$$\tilde{W}(j,k) = \dfrac{\tilde{c}}{\sqrt{\gamma(j,k)}}. \quad \text{Eq (16)}$$

where $\tilde{c}^2 = \beta$. The weighted transmit power for each transmission channel may then be expressed as:

$$P_{tx}(j,k) = \begin{cases} \dfrac{\beta P_{tx}}{\gamma(j,k)}, & \gamma(j,k) \geq \alpha \gamma_{ave} \\ 0, & \text{otherwise} \end{cases}. \quad \text{Eq (17)}$$

As shown in equation (17), only transmission channels for which the received SNR is greater than or equal to an SNR threshold (i.e., $\gamma(j,k) \geq \alpha \gamma_{ave}$) are selected for use.

If the total transmit power is distributed across all selected transmission channels such that the received SNR is approximately similar for all selected channels, then the resulting received SNR for each transmission channel may be expressed as:

$$\tilde{\gamma}(j,k) = \begin{cases} \dfrac{\beta \gamma_{total}}{\gamma_{ave}}, & \gamma(j,k) \geq \alpha \gamma_{ave} \\ 0, & \text{otherwise} \end{cases}. \quad \text{Eq (18)}$$

By substituting $\gamma_{ave}$ from equation (13) and $\gamma_{total}$ from equation (14) into equation (18), the following is obtained:

$$\tilde{\gamma}(j,k) = \begin{cases} \beta N_T N_F, & \gamma(j,k) \geq \alpha \gamma_{ave} \\ 0, & \text{otherwise} \end{cases}.$$

Channel Inversion for Segregated Groups of Transmission Channels

In the above description, the channel inversion is applied to all available transmission channels or selectively to a subset of the available transmission channels (which are selected based on a particular threshold). This then allows a common coding and modulation scheme to be used for all transmission channels to be used for data transmission.

The selective channel inversion may also be applied individually and independently to groups of transmission channels. In this case, the available transmission channels in the communication system are initially segregated into a number of groups. Any number of groups may be formed, and each group may include any number of channels (i.e., there need not be equal number of channels in each group).

A particular amount of transmit power is also available for each group based on various system constraints and considerations. For a full channel inversion technique, the available transmit power for each group is allocated to all transmission channels in the group such that the received signal quality for these channels is approximately equal (i.e., similar received SNRs). And for a selective channel inversion technique, all or a subset of the available transmission channels in each group are selected for use, e.g., based on a particular threshold determined for the group. The available transmit power for each group is then allocated to the selected transmission channels in the group such that the received signal quality for the channels is approximately equal.

Various additional flexibilities are afforded by processing data separately for each group of transmission channels. For example, the full or selective channel inversion may be independently applied to each group of channels. Also, for those groups for which selective channel inversion is applied, one threshold may be used for all groups, each group may be assigned a separate threshold, or some groups may share the same threshold while other groups may be assigned separate thresholds. A different coding and modulation scheme may also be used for each group, which may be selected based on the received SNR achieved by the transmission channels in the group.

For a MIMO system that utilizes OFDM, the MIMO construct creates multiple ($N_S$) transmission channels in the spatial domain and the OFDM construct creates multiple ($N_F$) transmission channels in the frequency domain. The total number of transmission channels available to send data is then $N=N_S \cdot N_F$. The N transmission channels may then be segregated into a number of groups in various ways.

In one embodiment, the transmission channels are segregated on a per transmit antenna basis. If the number of spatial subchannels is equal to the number of transmit antennas (i.e., $N_T=N_S$), then the full or selective channel inversion may be applied independently to each of the $N_T$ transmit antennas. In an embodiment, selective channel inversion is used for each group, and the $N_T$ groups corresponding to the $N_T$ transmit antennas may be associated with $N_T$ respective thresholds, one threshold for each group or transmit antenna. The selective channel inversion then determines the subset of transmission channels (or frequency subchannels) associated with each transmit antenna having adequate received SNRs, which can be achieved by comparing the received SNR for each frequency subchannel to the threshold for the transmit antenna. The total transmit power available for each transmit antenna is then allocated to the selected frequency subchannels for the transmit antenna such that the received SNRs for these frequency subchannels are approximately similar.

In another embodiment, the available transmission channels are segregated on a per frequency subchannel basis. In this embodiment, the full or selective channel inversion may be applied independently to each of the $N_F$ frequency subchannels. If selective channel inversion is used, then the spatial subchannels in each group may be selected for use for data transmission based on the threshold for the group corresponding to that frequency subchannel.

The segregation of the available transmission channels into groups permits optimization to be achieved on a per group basis (e.g., per transmit antenna or per frequency subchannel), which then allows a specific coding and modulation scheme to be used for all selected transmission channels in each group. For example, one or more transmit antennas may be assigned to each scheduled terminal for data transmission. The transmission channels associated with the assigned transmit antennas may be placed in a group, and the selective channel inversion may be performed on this group of transmission channels such that a single coding and modulation scheme may be used for the data transmission to this terminal.

If equal transmit power is used for all available transmission channels in group j and the noise variance, $\sigma^2$, is constant for all channels, then the received SNR, $\gamma_j(k)$, for transmission channel k in group j can be expressed as:

$$\gamma_j(k) = \frac{P_{rx,j}(k)}{\sigma^2} = \frac{P_{tx,j}}{\sigma^2 N_j}|H_j(k)|^2. \quad \text{Eq (19)}$$

where
- $P_{rx,j}(k)$ is the received power for transmission channel k in group j,
- $P_{tx,j}$ is the total available transmit power for group j,
- $H_j(k)$ is effective channel gain from the transmitter to the receiver for transmission channel k in group j, and
- $N_j$ is the number of transmission channels in group j. Group j may correspond to a specific transmit antenna j, in which case $N_j=N_F$.

The average received SNR, $\gamma_{ave,j}$, for each available transmission channel in group j may be expressed as:

$$\gamma_{ave,j} = \frac{P_{tx,j}}{\sigma^2 N_j^2} \sum_{k=1}^{N_j} |H_j(k)|^2. \quad \text{Eq (20)}$$

Equation (20) assumes equal transmit power over the $N_j$ available transmission channels in group j. The received SNR, $\gamma_{total,j}$, for all available transmission channels in group j may then be expressed as:

$$\gamma_{total,j} = \frac{P_{tx,j}}{\sigma^2} L_{ave,j} = \frac{P_{tx,j}}{\sigma^2 N_j} \sum_{k=1}^{N_j} |H_j(k)|^2, \quad \text{Eq (21)}$$

where $$L_{ave,j} = \frac{1}{N_j} \sum_{k=1}^{N_j} |H_j(k)|^2. \quad \text{Eq (22)}$$

The total received SNR, $\gamma_{total,j}$, for group j is based on the total transmit power, $P_{tx,j}$, for group j being equally distributed across all available transmission channels in the group.

A normalization factor, $\beta_j$, used to distribute the total transmit power $P_{tx,j}$ among the selected transmission channels in group j can be expressed as:

$$\beta_j = \frac{1}{\sum_{\lambda_j(k) \geq \alpha_j \lambda_{ave,j}} \gamma_j(k)^{-1}}. \quad \text{Eq (23)}$$

As shown in equation (23), the normalization factor $\beta_j$ is computed based on the SNRs of all selected transmission channels in group j, with the channels being selected based on the threshold, $\alpha_j \gamma_{ave,j}$, determined for the group.

To achieve similar received SNR for all selected transmission channels in the group, the modulation symbols for each selected transmission channel may be weighted by a weight that is related to that channel's SNR, which may be expressed as:

$$\tilde{w}_j(k) = \frac{\tilde{c}}{\sqrt{\gamma_j(k)}}. \quad \text{Eq (24)}$$

where $\tilde{c}_j^2 = \beta_j$. The weighted transmit power for each transmission channel may then be expressed as:

$$P_{tx,j}(k) = \begin{cases} \frac{\beta_j P_{tx,j}}{\gamma_j(k)} & , \gamma_j(k) \geq \alpha_j \gamma_{ave,j} \\ 0 & , \text{otherwise} \end{cases} \quad \text{Eq (25)}$$

As shown in equation (25), only transmission channels for which the received SNR is greater than or equal to the SNR threshold (i.e., $\gamma_j(k) \geq \alpha_j \gamma_{ave,j}$) are selected for use.

If the total transmit power is distributed across all selected transmission channels in the group such that the received SNR is approximately similar for all selected channels, then the resulting received SNR for each transmission channel may be expressed as:

$$\tilde{\gamma}_j(k) = \begin{cases} \frac{\beta_j \gamma_{total,j}}{\gamma_{ave,j}} = \beta_j N_j & , \gamma_j(k) \geq \alpha_j \gamma_{ave,j} \\ 0 & , \text{otherwise} \end{cases} \quad \text{Eq (26)}$$

The process described above may be repeated for each group of transmission channels. Each group may be associated with a different threshold, $\alpha_j \gamma_{ave,j}$, derived to provide the desire performance for that group. The ability to allocate transmit power on a per group (e.g., per transmit antenna) basis can provide enhanced flexibility and may further improve performance.

Figure 2A:
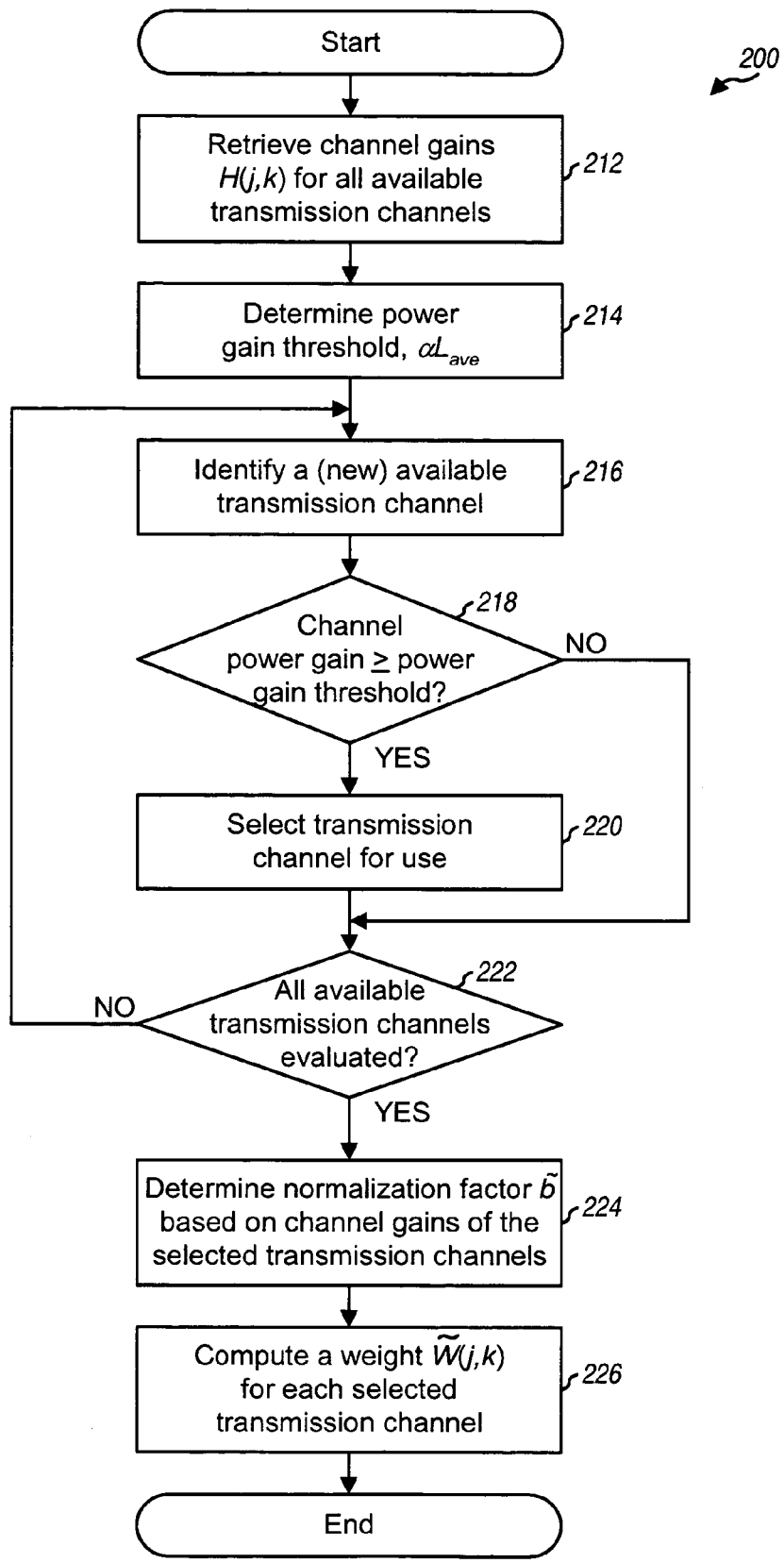
FIG. 2A is a flow diagram of a process to determine the amount of transmit power to be allocated to each selected transmission channel based on selective channel inversion, in accordance with an embodiment of the invention.

FIG. 2A is a flow diagram of a process 200 to determine the amount of transmit power to be allocated to each selected transmission channel based on selective channel inversion, in accordance with an embodiment of the invention. Process 200 assumes that all available transmission channels are considered (i.e., one group of transmission channels for the communication system). Process 200 may be used if the channel gains H(j,k), the received SNRs γ(j,k), or some other characteristics are available for the transmission channels. For clarity, process 200 is described below for the case in which the channel gains are available, and the case in which the received SNRs are available is shown within brackets.

Initially, the channel gains H(j,k) [or the received SNRs γ(j,k)] of all available transmission channels are retrieved, at step 212. A power gain threshold, $\alpha L_{ave}$, [or an SNR threshold, $\alpha \gamma_{ave}$] used to select transmission channels for data transmission is also determined, at step 214. The threshold may be computed as described in further detail below.

Each available transmission channel is then evaluated for possible use. A (not yet evaluated) available transmission channel is identified for evaluation, at step 216. For the identified transmission channel, a determination is made whether or not the power gain [or the received SNR] for the channel is greater than or equal to the power gain threshold (i.e., $|H(j,k)|^2 \geq \alpha L_{ave}$) [or the SNR threshold (i.e., $\gamma(j,k) \geq \alpha \gamma_{ave}$], at step 218. If the identified transmission channel satisfies the criteria, then it is selected for use, at step 220. Otherwise, if the transmission channel does not satisfy the criteria, it is discarded and not used for data transmission.

A determination is then made whether or not all available transmission channels have been evaluated, at step 222. If not, the process returns to step 216 and another available transmission channel is identified for evaluation. Otherwise, the process proceeds to step 224.

At step 224, a normalization factor $\tilde{b}$ [or $\beta$] used to distribute the total transmit power among the selected transmission channels is determined based on the channel gains [or the received SNRs] of the selected channels, at step 224. This can be achieved as shown in equation (10) [or equation (15)]. A weight $\tilde{W}(j,k)$ is next computed for each selected transmission channel, at step 226, based on the normalization factor and that channel's gain [or SNR]. The weight can be computed as shown in equation (8) [or equation (16)]. The weighted transmit power for each selected transmission channel would then be as shown in equation (9) [or equation (17)]. The process then terminates.

In the above description, the total available transmit power for each group is allocated (unevenly) to the selected transmission channels in the group based on their respective weights such that the received SNRs for these channels are approximately similar. (There may be only one group of transmission channels.) In some other embodiments, the total available transmit power may be allocated equally amongst the selected transmission channels, in which case the weights for the selected transmission channels are equal. This may be implemented, for example, if the common coding and modulation scheme for a group is selected based on the average SNR for the selected transmission channels in the group. The desired level of performance may be achieved, for example, by interleaving the data across all selected transmission channels in the group or via some other processing scheme.

Threshold Selection

The threshold, α, used to select transmission channels for use for data transmission may be set based on various criteria. In one embodiment, the threshold is set to optimize throughput.

Initially, a vector of setpoints (i.e., $Z = [z_1, z_2, \ldots, z_{N_Z}]$) and a vector of code rates (i.e., $R = [r_1, r_2, \ldots, r_{N_Z}]$) are defined. The code rates include the effects of the coding and modulation scheme and are representative of the number of information bits per modulation symbol. Each vector includes $N_Z$ elements corresponding to the number of available code rates, which may be those available for use in the system. Alternatively, $N_Z$ setpoints may be defined based on the operating points supported by the system. Each setpoint corresponds to a particular received SNR needed to achieve a particular level of performance. The setpoint is typically dependent on the transmission bit rate (i.e., the number of information bits per modulation symbol), which is further dependent on the code rate and the modulation scheme used for the data transmission. As noted above, a common modulation scheme is used for all selected transmission channels. In this case, the transmission bit rate and thus the setpoint is directly related to the code rate.

Each code rate $r_n$, where $1 \leq n \leq N_Z$, is associated with a respective setpoint $z_n$, which is the minimum received SNR required to operate at that code rate for the required level of performance. The required setpoint $z_n$ may be determined based on computer simulation, mathematical derivation, and/or empirical measurement, as is known in the art. The elements in the two vectors R and Z may also be ordered such that $\{z_1 > z_2 > \ldots > z_{N_Z}\}$ and $\{r_1 > r_2 > \ldots > r_{N_Z}\}$, with $z_1$ being the largest setpoint and $r_1$ being the highest supported code rate.

The channel gains for all available transmission channels are used to compute power gains, which are then ranked and placed in a list $H(l)$ in order of decreasing power gains, where $1 \leq l \leq N_T N_F$, such that $H(1) = \max \{|H(j,k)|^2\}, \ldots,$ and $H(N_T N_F) = \min \{|H(j,k)|^2\}$.

A sequence $\tilde{b}(l)$ of possible normalization factors is also defined as follows:

$$\tilde{b}(\ell) = \frac{1}{\sum_{i=1}^{\ell} |H(j,k)|^{-2}}, \quad 1 \leq \ell \leq N_T N_F. \qquad \text{Eq (27)}$$

Each element of the sequence $\tilde{b}(l)$ may be used as a normalization factor if the l best transmission channels are selected for use.

For each code rate $r_n$ (where $1 \leq n \leq N_Z$), the largest value of l, $l_{n,max}$, is determined such that the received SNR for each of the l best transmission channels is greater than or equal to the setpoint $z_n$ associated with the code rate $r_n$. This condition may be expressed as:

$$\frac{\tilde{b}(\ell) P_{tx}}{\sigma^2} \geq z_n, \qquad \text{Eq (28)}$$

where $\sigma^2$ is the received noise power in a single transmission channel. The largest value of l, $l_{n,max}$, can be identified by evaluating each possible value of l starting with 1 and terminating when equation (28) is no longer valid. For each value of l, the achievable SNR for the l best transmission channels may be determined as shown by the left argument of equation (28). This achievable SNR is then compared against the SNR, $z_n$, required for that code rate $r_n$.

Thus, for each code rate $r_n$, each value of l (for $l=1, 2, \ldots, l_{n,max}$) is evaluated to determine whether the received SNR for each of the l best transmission channels can achieve the associated setpoint $z_n$, if the total transmit power is (unevenly) distributed across all l channels. The largest value of l, $l_{n,max}$, that satisfies this condition is the greatest number of transmission channels that may be selected for code rate $r_n$ while achieving the required setpoint $z_n$.

The threshold, $\alpha_n$, associated with code rate $r_n$ may then be expressed as:

$$\alpha_n = \frac{H(\ell_{n,\max})}{L_{ave}}. \qquad \text{Eq (29)}$$

The threshold $\alpha_n$ optimizes the throughput for code rate $r_n$, which requires the setpoint $z_n$. Since a common code rate is used for all selected transmission channels, the maximum achievable throughput, $T_n$, can be computed as the throughput for each channel (which is $r_n$) times the number of selected channels, $l_{n,max}$. The maximum achievable throughput $T_n$ for setpoint $z_n$ can then be expressed as:

$$T_n = l_{n,max} r_n, \qquad \text{Eq (30)}$$

where the unit for $T_n$ is in information bits per modulation symbol.

The optimum throughput for the vector of setpoints can then be given by:

$$T_{opt} = \max \{T_n\}. \qquad \text{Eq (31)}$$

As the code rate increases, more information bits may be transmitted per modulation symbol. However, the required SNR also increases, which requires more transmit power for each selected transmission channel for a given noise variance $\sigma^2$. Since the total transmit power is limited, fewer transmission channels may be able to achieve the higher required SNR. Thus, the maximum achievable throughput for each code rate in the vector R may be computed, and the specific code rate that provides the highest throughput may be deemed as the optimum code rate for the specific channel conditions being evaluated. The optimum threshold, $\alpha_{opt}$, is then equal to the threshold $\alpha_n$ corresponding to the specific code rate $r_n$ that results in $T_{opt}$.

In the above description, the optimum threshold $\alpha_{opt}$ is determined based on the channel gains for all transmission channels. If the received SNRs are available instead of the channel gains, then the received SNRs may be ranked and placed in a list $\gamma(l)$ in order of decreasing SNRs, where $1 \leq l \leq N_T N_F$, such that the first element in the list $\gamma(1) = \max \{\gamma(j,k)\}, \ldots,$ and the last element in the list $\gamma(N_T N_R) = \min \{\gamma(j,k)\}$. A sequence $\beta(l)$ may then be determined as:

$$\beta(\ell) = \frac{1}{\sum_{i=1}^{\ell} \gamma(i)^{-1}}. \qquad \text{Eq (32)}$$

For each code rate $r_n$ (where $1 \leq n \leq N_Z$), the largest value of l, $l_{n,max}$, is determined such that the received SNR for each of the l selected transmission channels is greater than or equal to the associated setpoint $z_n$. This condition may be expressed as:

$$\beta(l) N_T N_F \geq z_n. \qquad \text{Eq (33)}$$

Once the largest value of l, $l_{n,max}$, is determined for code rate $r_n$, the threshold $\alpha_n$ associated with this code rate may be determined as:

$$\alpha_n = \frac{\gamma(\ell_{n,\max})}{\gamma_{ave}}. \qquad \text{Eq (34)}$$

The optimum threshold, $\alpha_{opt}$, and the optimum throughput, $T_{opt}$, may also be determined as described above.

For the above description, the threshold is selected to optimize throughput for the available transmission channels. The threshold may also be selected to optimize other performance criteria or metrics, and this is within the scope of the invention.

Figure 2B:
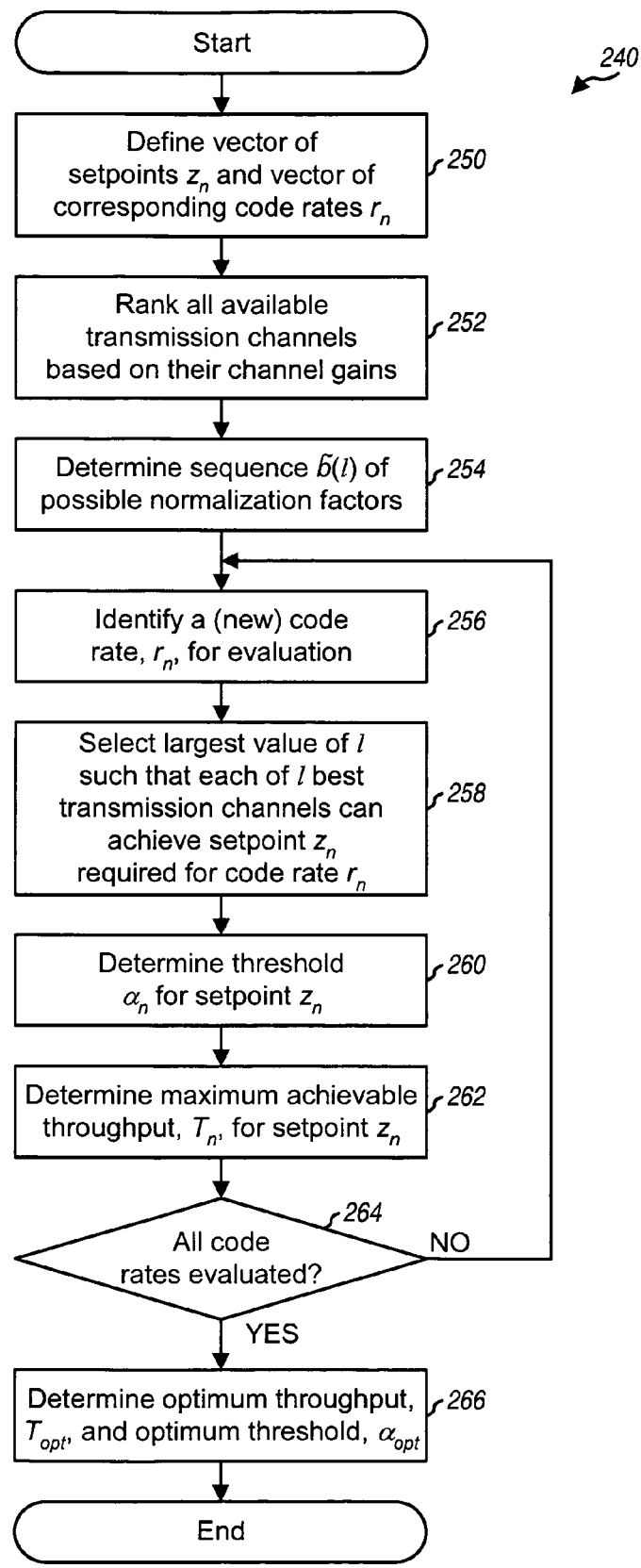
FIG. 2B is a flow diagram of a process to determine a threshold a used to select transmission channels for data transmission, in accordance with an embodiment of the invention.

FIG. 2B is a flow diagram of a process 240 to determine a threshold a used to select transmission channels for data transmission, in accordance with an embodiment of the invention. Process 240 may be used if the channel gains, received SNRs, or some other characteristics are available for the transmission channels. For clarity, process 240 is described below for the case in which the channel gains are available, and the case in which the received SNRs are available is shown within brackets.

Initially, a vector of setpoints ($Z=[z_1, z_2, \ldots, z_{N_Z}]$) is defined and a vector of code rates ($R=[r_1, r_2, \ldots, r_{N_Z}]$) that supports the associated setpoints is determined, at step 250. The channel gains H(j,k) [or the received SNRs γ(j,k)] for all available transmission channels are retrieved and ranked from the best to the worst, at step 252. The sequence $\tilde{b}(l)$ [or $\beta(l)$] of possible normalization factors is then determined based on the channel gains as shown in equation (27) [or based on the received SNRs as shown in equation (32)], at step 254.

Each available code rate is then evaluated via a loop. In the first step of the loop, a (not yet evaluated) code rate $r_n$ is identified for evaluation, at step 256. For the first pass through the loop, the identified code rate can be the first code rate $r_1$ in the vector R. For the identified code rate $r_n$, the largest value of l, $l_{n,max}$, is determined such that the received SNR for each of the l best transmission channels is greater than or equal to the setpoint $z_n$ associated with the code rate $r_n$ being evaluated, at step 258. This can be performed by computing and satisfying the condition shown in equation (28) [or equation (33)]. The threshold $\alpha_n$ associated with setpoint $z_n$ is then determined based on the channel gain [or the received SNR] of channel $l_{n,max}$ as shown in equation (29) [or equation (34)], at step 260. The maximum achievable throughput, $T_n$, for setpoint $z_n$ can also be determined as shown in equation (30), at step 262.

A determination is then made whether or not all $N_Z$ code rates have been evaluated, at step 264. If not, the process returns to step 256 and another code rate is identified for evaluation. Otherwise, the optimum throughput, $T_{opt}$, and the optimum threshold, $\alpha_{opt}$, may be determined as shown in equation (31), at step 266. The process then terminates.

In the above description, one threshold is determined for all available transmission channels in the communication system since the selective channel inversion is performed on all channels. In embodiments wherein the transmission channels are segregated into a number of groups, one threshold may be determined and used for each group. The threshold for each group may be set based on various criteria, such as to optimize the throughput for the transmission channels included in the group.

To determine the threshold for each group, the derivations described above may also be used. However, the list $H_j(l)$ [or $\gamma_j(l)$] for each group only includes the power gains [or received SNRs] for the transmission channels included in the group. Also, the sequence $\tilde{b}_j(l)$ [or $\beta_j(l)$] would include the possible normalization factors defined based on the channel gains [or received SNRs] of the transmission channels in the group. The threshold $\alpha_{j,n}$ associated with code rate $r_n$ for group j may then be expressed as:

$$\alpha_{j,n} = \frac{H_j(\ell_{n,\max})}{L_{ave,j}} \text{ or } \frac{\gamma_j(\ell_{n,\max})}{\gamma_{ave,j}}. \quad \text{Eq (35)}$$

The optimum threshold $\alpha_{opt,j}$ for group j is equal to the threshold $\alpha_{j,n}$ corresponding to the specific code rate $r_n$ that results in the optimal throughput $T_{opt,j}$ for group j.

Each group of transmission channels may be associated with a respective threshold. Alternatively, a number of groups may share the same threshold. This may be desirable, for example, if the same coding and modulation scheme is to be used for a number of transmit antennas and the available transmit power may be shared between these transmit antennas.

In the above description, the threshold is derived based on (unequal) distribution of the total available transmit power amongst the selected transmission channels to achieve similar received SNRs for these channels. In some other embodiments, the threshold may be derived based on some other conditions and/or metrics. For example, the threshold may be derived based on equal allocation of the total available transmit power amongst the selected transmission channels (i.e., equal weights for the selected transmission channels). In this case, the threshold may be selected to maximize the throughput achieved based on this equal transmit power allocation. As another example, the threshold may simply be a particular (fixed) target SNR.

Multi-Channel Communication System

Figure 3:
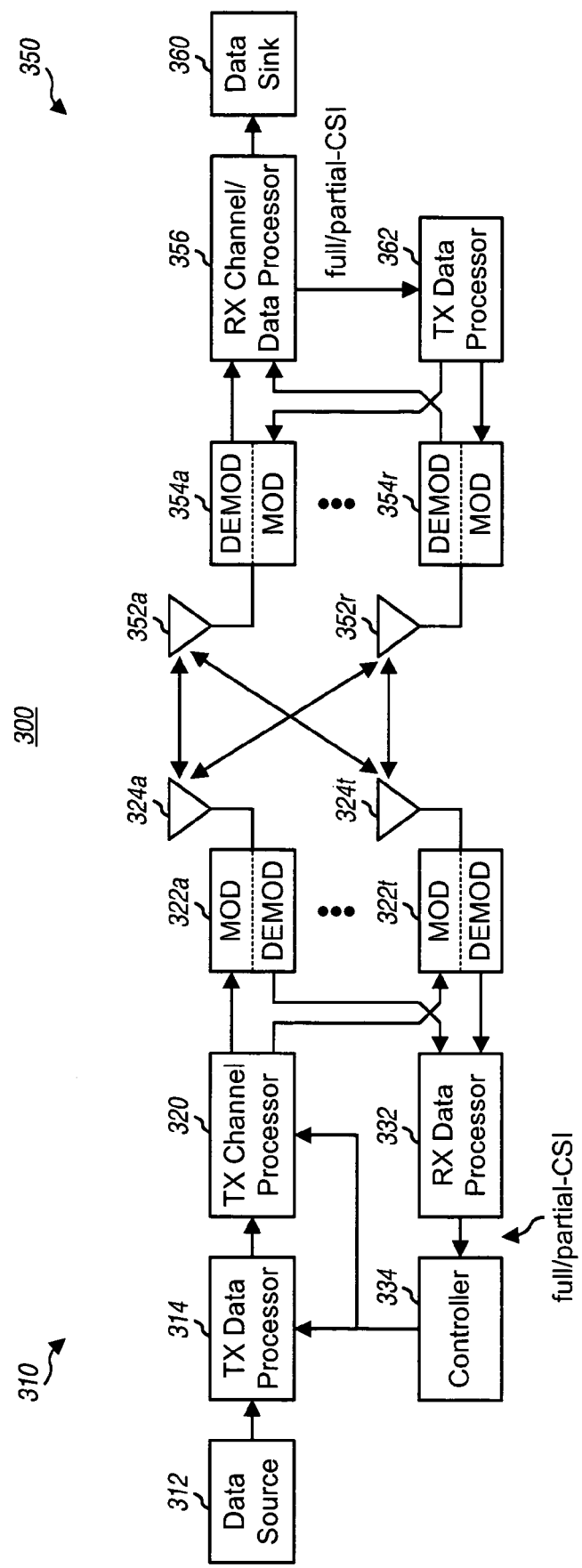
FIG. 3 is a diagram of a MIMO communication system capable of implementing various aspects and embodiments of the invention.

FIG. 3 is a diagram of a MIMO communication system 300 capable of implementing various aspects and embodiments of the invention. System 300 includes a first system 310 (e.g., base station 104 in FIG. 1) in communication with a second system 350 (e.g., terminal 106). System 300 may be operated to employ a combination of antenna, frequency, and temporal diversity to increase spectral efficiency, improve performance, and enhance flexibility.

At system 310, a data source 312 provides data (i.e., information bits) to a transmit (TX) data processor 314, which (1) encodes the data in accordance with a particular encoding scheme, (2) interleaves (i.e., reorders) the encoded data based on a particular interleaving scheme, (3) maps the interleaved bits into modulation symbols for one or more transmission channels selected for use for data transmission, and (4) weights the modulation symbols for each selected transmission channel. The encoding increases the reliability of the data transmission. The interleaving provides time diversity for the coded bits, permits the data to be transmitted based on an average SNR for the selected transmission channels, combats fading, and further removes correlation between coded bits used to form each modulation symbol. The interleaving may further provide frequency diversity if the coded bits are transmitted over multiple frequency subchannels. The weighting effectively controls the transmit power for each selected transmission channel to achieve a desired SNR at the receiver system. In an aspect, the coding, symbol mapping, and weighting may be performed based on control signals provided by a controller 334.

A TX channel processor 320 receives and demultiplexes the weighted modulation symbols from TX data processor 314 and provides a stream of weighted modulation symbols for each selected transmission channel, one weighted modulation symbol per time slot. TX channel processor 320 may further precondition the weighted modulation symbols for the selected transmission channels if full CSI is available.

If OFDM is not employed, TX channel processor 320 provides a stream of weighted modulation symbols for each antenna used for data transmission. And if OFDM is employed, TX channel processor 320 provides a stream of weighted modulation symbol vectors for each antenna used for data transmission. And if full-CSI processing is performed, TX channel processor 320 provides a stream of preconditioned modulation symbols or preconditioned modulation symbol vectors for each antenna used for data transmission. Each stream is then received and modulated by a respective modulator (MOD) 322 and transmitted via an associated antenna 324.

At receiver system 350, a number of receive antennas 352 receive the transmitted signals and provide the received signals to respective demodulators (DEMOD) 354. Each demodulator 354 performs processing complementary to that performed at modulator 322. The modulation symbols from all demodulators 354 are provided to a receive (RX) channel/data processor 356 and processed to recover the transmitted data streams. RX channel/data processor 356 performs processing complementary to that performed by TX data processor 314 and TX channel processor 320 and provides decoded data to a data sink 360. The processing by receiver system 350 is described in further detail below.

MIMO Transmitter Systems

Figure 4A:
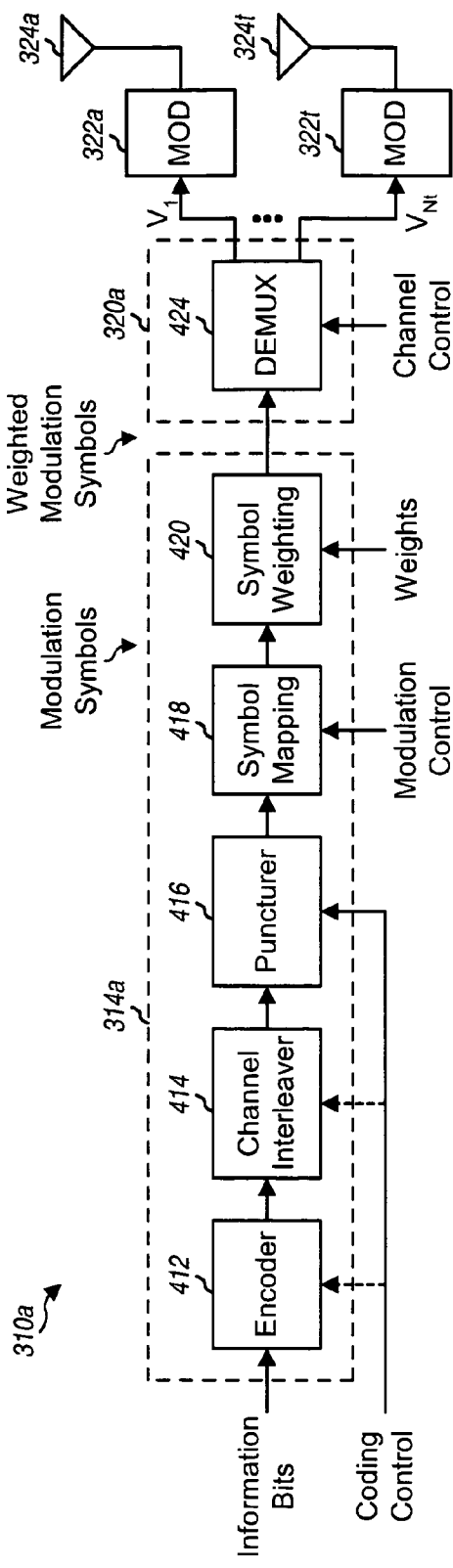
FIGS. 4A through 4D are block diagrams of four MIMO transmitter systems capable of processing data in accordance with four specific embodiments of the invention.

FIG. 4A is a block diagram of a MIMO transmitter system 310a, which is capable of processing data in accordance with an embodiment of the invention. Transmitter system 310a is one embodiment of the transmitter portion of system 310 in FIG. 3. System 310a includes (1) a TX data processor 314a that receives and processes information bits to provide weighted modulation symbols and (2) a TX channel processor 320a that demultiplexes the modulation symbols for the selected transmission channels.

In the embodiment shown in FIG. 4A, TX data processor 314a includes an encoder 412, a channel interleaver 414, a puncturer 416, a symbol mapping element 418, and a symbol weighting element 420. Encoder 412 receives the aggregate information bits to be transmitted and encodes the received bits in accordance with a particular encoding scheme to provide coded bits. Channel interleaver 414 interleaves the coded bits based on a particular interleaving scheme to provide diversity. Puncturer 416 punctures (i.e., deletes) zero or more of the interleaved coded bits to provide the desired number of coded bits. Symbol mapping element 418 maps the unpunctured bits into modulation symbols for the selected transmission channels. And symbol weighting element 420 weighs the modulation symbols for each selected transmission channel to provide weighted modulation symbols. The weight used for each selected transmission channel may be determined based on that channel's achieved SNR, as described above.

Pilot data (e.g., data of known pattern) may also be encoded and multiplexed with the processed information bits. The processed pilot data may be transmitted (e.g., in a time division multiplexed (TDM) manner) in a subset or all of the selected transmission channels, or in a subset or all of the available transmission channels. The pilot data may be used at the receiver to perform channel estimation, as described below.

As shown in FIG. 4A, the data encoding, interleaving, and puncturing may be achieved based on one or more coding control signals, which identify the specific coding, interleaving, and puncturing schemes to be used. The symbol mapping may be achieved based on a modulation control signal that identifies the specific modulation scheme to be used. And the symbol weighting may be achieved based on weights provided for the selected transmission channels.

In one coding and modulation scheme, the coding is achieved by using a fixed base code and adjusting the puncturing to achieve the desired code rate, as supported by the SNR of the selected transmission channels. The base code may be a Turbo code, a convolutional code, a concatenated code, or some other code. The base code may also be of a particular rate (e.g., a rate ⅓ code). For this scheme, the puncturing may be performed after the channel interleaving to achieve the desired code rate for the selected transmission channels.

Symbol mapping element 416 can be designed to group sets of unpunctured bits to form non-binary symbols, and to map each non-binary symbol into a point in a signal constellation corresponding to the modulation scheme selected for use for the selected transmission channels. The modulation scheme may be QPSK, M-PSK, M-QAM, or some other scheme. Each mapped signal point corresponds to a modulation symbol.

The encoding, interleaving, puncturing, and symbol mapping at transmitter system 310a can be performed based on numerous schemes. One specific scheme is described in the aforementioned U.S. patent application Ser. No. 09/776,075.

The number of information bits that may be transmitted for each modulation symbol for a particular level of performance (e.g., one percent packet error rate or PER) is dependent on the received SNR. Thus, the coding and modulation scheme for the selected transmission channels may be determined based on the characteristics of the channels (e.g., the channel gains, received SNRs, or some other information). The channel interleaving may also be adjusted based on the coding control signal.

Table 1 lists various combinations of coding rate and modulation scheme that may be used for a number of received SNR ranges. The supported bit rate for each transmission channel may be achieved using any one of a number of possible combinations of coding rate and modulation scheme. For example, one information bit per modulation symbol may be achieved using (1) a coding rate of ½ and QPSK modulation, (2) a coding rate of ⅓ and 8-PSK modulation, (3) a coding rate of ¼ and 16-QAM, or some other combination of coding rate and modulation scheme. In Table 1, QPSK, 16-QAM, and 64-QAM are used for the listed SNR ranges. Other modulation schemes such as 8-PSK, 32-QAM, 128-QAM, and so on, may also be used and are within the scope of the invention.

TABLE 1

| Received SNR Range | # of Information Bits/Symbol | Modulation Symbol | # of Coded Bits/Symbol | Coding Rate |
| --- | --- | --- | --- | --- |
| 1.5-4.4 | 1 | QPSK | 2 | ½ |
| 4.4-6.4 | 1.5 | QPSK | 2 | ¾ |
| 6.4-8.35 | 2 | 16-QAM | 4 | ½ |
| 8.35-10.4 | 2.5 | 16-QAM | 4 | ⅝ |
| 10.4-12.3 | 3 | 16-QAM | 4 | ¾ |
| 12.3-14.15 | 3.5 | 64-QAM | 6 | 7/12 |
| 14.15-15.55 | 4 | 64-QAM | 6 | ⅔ |
| 15.55-17.35 | 4.5 | 64-QAM | 6 | ¾ |
| >17.35 | 5 | 64-QAM | 6 | ⅚ |

The weighted modulation symbols from TX data processor 314a are provided to TX channel processor 320a, which is one embodiment of TX channel processor 320 in FIG. 3. Within TX channel processor 320a, a demultiplexer 424 receives and demultiplexes the weighted modulation symbol into a number of modulation symbol streams, one stream for each transmission channel selected to transmit the modulation symbols. Each modulation symbol stream is provided to a respective modulator 322. If OFDM is employed, the weighted modulation symbols at each time slot for all selected frequency subchannels of each transmit antenna are combined into a weighted modulation symbol vector. Each modulator 322 converts the weighted modulation symbols (for a system without OFDM) or the weighted modulation symbol vectors (for a system with OFDM) into an analog signal, and further amplifies, filters, quadrature modulates, and upconverts the signal to generate a modulated signal suitable for transmission over the wireless link.

Figure 4B:
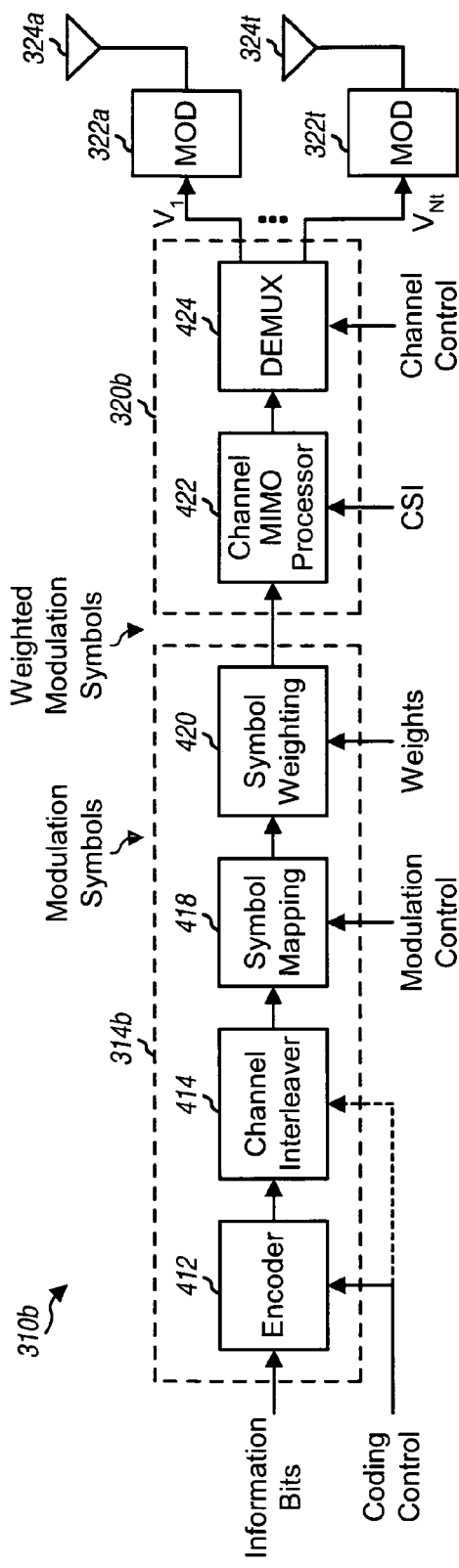

FIG. 4B is a block diagram of a MIMO transmitter system 310b, which is capable of processing data in accordance with another embodiment of the invention. Transmitter system 310b is another embodiment of the transmitter portion of system 310 in FIG. 3 and includes a TX data processor 314b and a TX channel processor 320b.

In the embodiment shown in FIG. 4B, TX data processor 314b includes encoder 412, channel interleaver 414, symbol mapping element 418, and symbol weighting element 420. Encoder 412 receives and encodes the aggregate information bits in accordance with a particular encoding scheme to provide coded bits. The coding may be achieved based on a particular code and code rate selected by controller 334, as identified by the coding control signals. Channel interleaver 414 interleaves the coded bits, and symbol mapping element 418 maps the interleaved bits into modulation symbols for the selected transmission channels. Symbol weighting element 420 weighs the modulation symbols for each selected transmission channel based on a respective weight to provide weighted modulation symbols.

In the embodiment shown in FIG. 4B, transmitter system 310b is capable of preconditioning the weighted modulation symbols based on full CSI. Within TX channel processor 320b, a channel MIMO processor 422 demultiplexes the weighted modulation symbols into a number of (up to $N_C$) weighted modulation symbol streams, one stream for each spatial subchannel (i.e., eigenmode) used to transmit the modulation symbols. For full-CSI processing, channel MIMO processor 422 preconditions the (up to $N_C$) weighted modulation symbols at each time slot to generate $N_T$ preconditioned modulation symbols, as follows:

$$\begin{bmatrix} x_1 \\ x_2 \\ \vdots \\ x_{N_T} \end{bmatrix} = \begin{bmatrix} e_{11}, & e_{12}, & \cdots & e_{1N_C} \\ e_{21}, & e_{22}, & & e_{2N_C} \\ \vdots & & \ddots & \vdots \\ e_{N_T1}, & e_{N_T1}, & \cdots & e_{N_TN_C} \end{bmatrix} \cdot \begin{bmatrix} b_1 \\ b_2 \\ \vdots \\ b_{N_C} \end{bmatrix} \quad \text{Eq (36)}$$

where $b_1, b_2, \ldots b_{N_C}$ are respectively the weighted modulation symbols for spatial
subchannels $1, 2, \ldots N_C$;
$e_{ij}$ are elements of an eigenvector matrix E related to the transmission characteristics from the transmit antennas to the receive antennas; and
$x_1, x_2, \ldots x_{N_T}$ are the preconditioned modulation symbols, which can be expressed as:

$x_1 = b_1 \cdot e_{11} + b_2 \cdot e_{12} + \ldots + b_{N_C} \cdot e_{1N_C},$ $x_2 = b_1 \cdot e_{21} + b_2 \cdot e_{22} + \ldots + b_{N_C} \cdot e_{2N_C},$ and $x_{N_T} = b_1 \cdot e_{N_T1} + b_2 \cdot e_{N_T2} + \ldots + b_{N_C} \cdot e_{N_TN_C}.$ The eigenvector matrix E may be computed by the transmitter or is provided to the transmitter by the receiver. The elements of the matrix E are also taken into account in determining the effective channel gains $H(j,k)$.

For full-CSI processing, each preconditioned modulation symbol, $x_i$, for a particular transmit antenna represents a linear combination of the weighted modulation symbols for up to $N_C$ spatial subchannels. For each time slot, the (up to) $N_T$ preconditioned modulation symbols generated by channel MIMO processor 422 are demultiplexed by demultiplexer 424 and provided to (up to) $N_T$ modulators 322. Each modulator 322 converts the preconditioned modulation symbols (for a system without OFDM) or the preconditioned modulation symbol vectors (for a system with OFDM) into a modulated signal suitable for transmission over the wireless link.

Figure 4C:
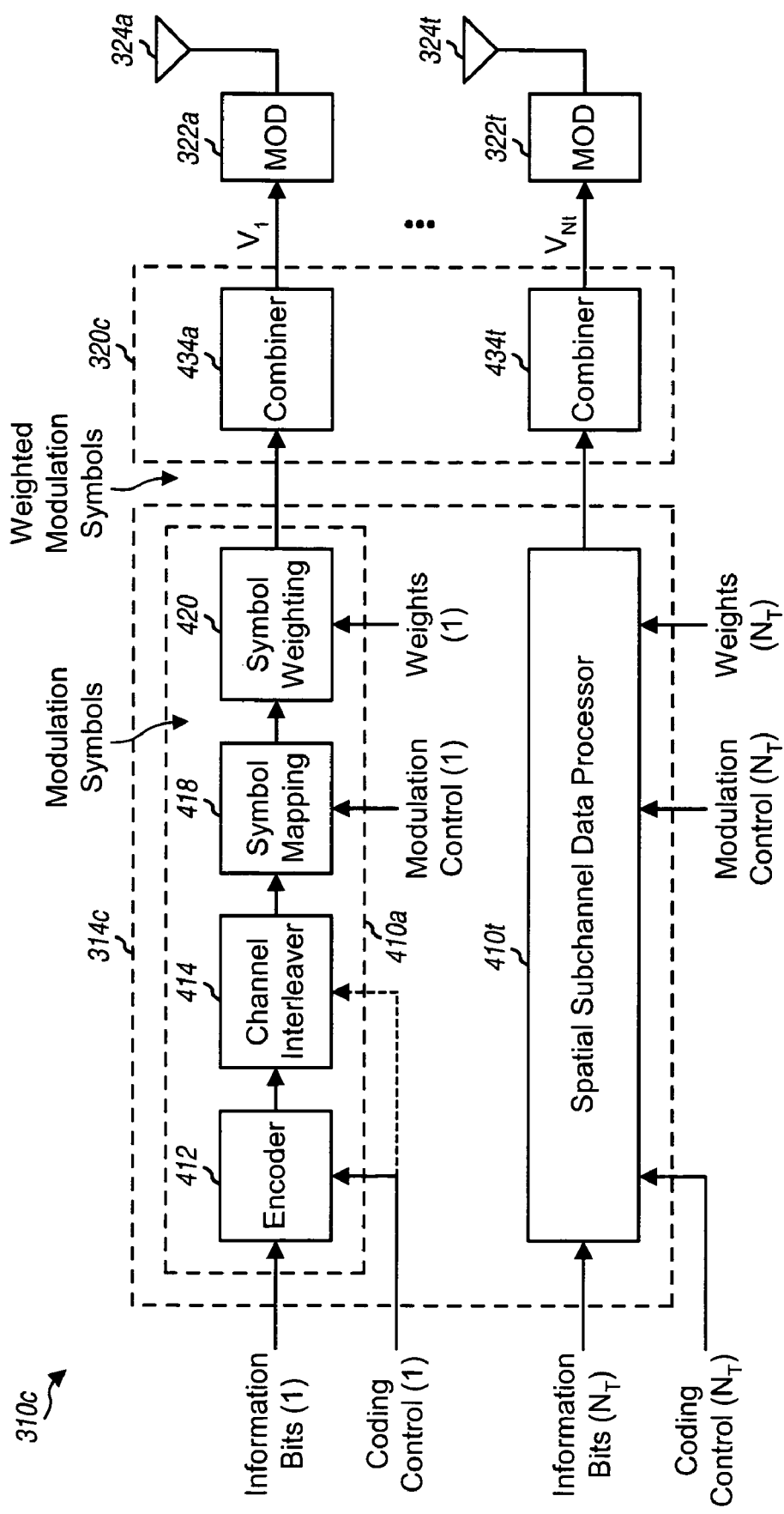

FIG. 4C is a block diagram of a MIMO transmitter system 310c, which utilizes OFDM and is capable of processing data in accordance with yet another embodiment of the invention. Transmitter system 310c is another embodiment of the transmitter portion of system 310 in FIG. 3 and includes a TX data processor 314c and a TX channel processor 320c. TX data processor 314c may be operated to independently code and modulate each group of transmission channels based on a particular coding and modulation scheme selected for the group. Each group may correspond to one transmit antenna and the transmission channels in each group may correspond to the frequency subchannels for the transmit antenna.

In the embodiment shown in FIG. 4C, TX data processor 314c includes a number of spatial subchannel data processor 410a through 410t, one data processor 410 for each group of transmission channels to be independently coded and modulated. Each data processor 410 includes encoder 412, channel interleaver 414, symbol mapping element 418, and symbol weighting element 420. These elements of data processor 410 operate to encode the information bits for a group being processed by the data processor, interleave the coded bits, map the interleaved bits to generated modulation symbols, and weight the modulation symbols for each selected transmission channel within the group. As shown in FIG. 4C, the coding and modulation control and the weights may be specifically provided for each group.

The weighted modulation symbols from each data processor 410 are provided to a respective combiner 434 within TX channel processor 320c, which combines the weighted modulation symbols for a particular transmit antenna. If each group includes the selected frequency subchannels for a particular transmit antenna, then combiner 434 combines the weighted modulation symbols for the selected frequency subchannels to form a modulation symbol vector for each transmission channel, which is then provided to a respective modulator 322. The processing by each modulator 322 to generate a modulated signal is described below.

Figure 4D:
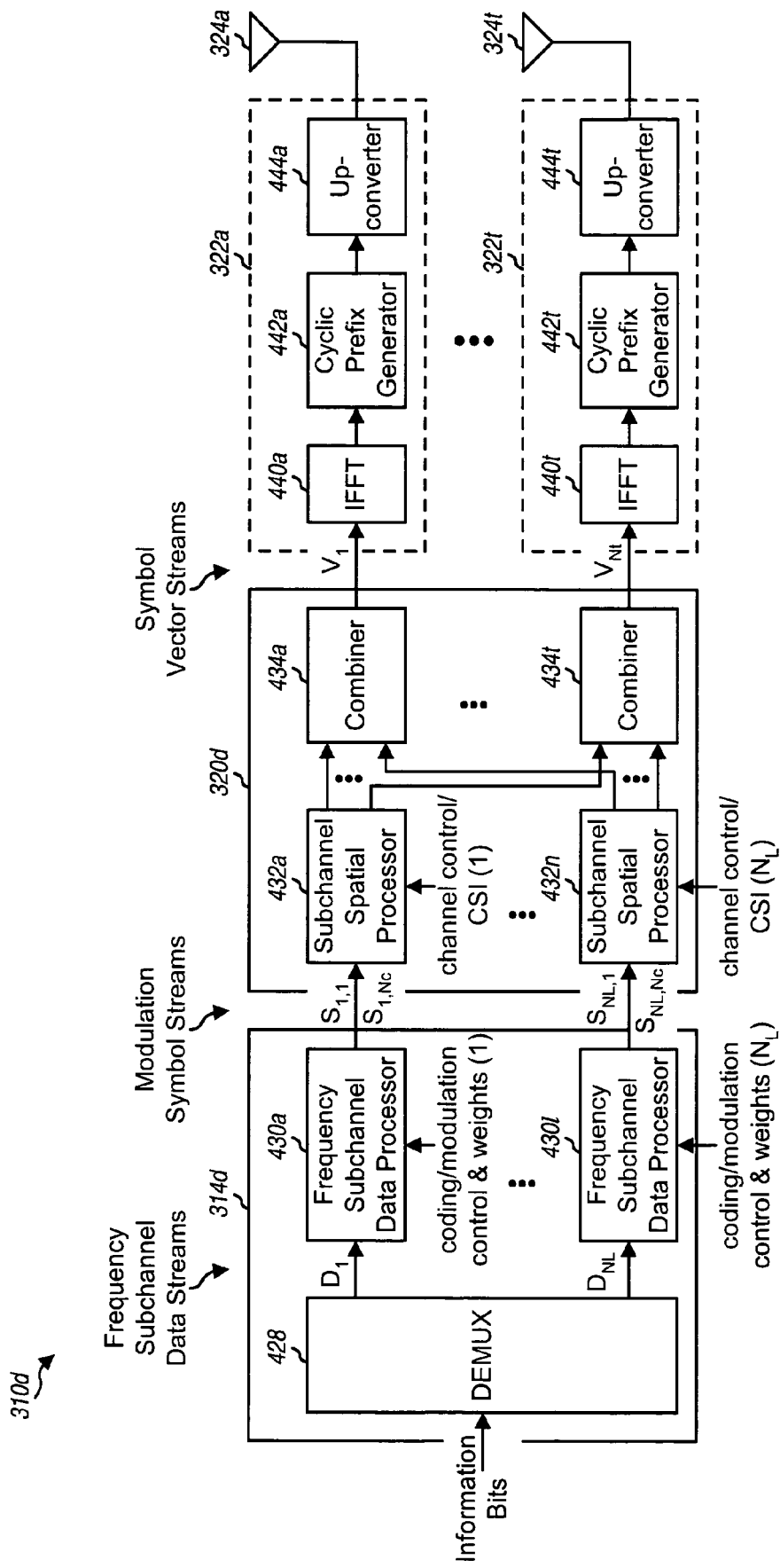

FIG. 4D is a block diagram of a MIMO transmitter system 310d, which also utilizes OFDM and is capable of processing data in accordance with yet another embodiment of the invention. In this embodiment, the transmission channels for each frequency subchannel may be independently processed. Within a TX data processor 314c, the information bits to be transmitted are demultiplexed by a demultiplexer 428 into a number of (up to $N_L$) frequency subchannel data streams, one stream for each of the frequency subchannels to be used for data transmission. Each frequency subchannel data stream is provided to a respective frequency subchannel data processor 430.

Each data processor 430 processes data for a respective frequency subchannel of the OFDM system. Each data processor 430 may be implemented similar to TX data processor 314a in FIG. 4A, TX data processor 314b shown in FIG. 4B, or with some other design. In one embodiment, data processor 430 demultiplexes the frequency subchannel data stream into a number of data substreams, one data substream for each spatial subchannel selected for use for the frequency subchannel. Each data substream is then encoded, interleaved, symbol mapped, and weighted to generate weighted modulation symbols for the data substream. The coding and modulation for each frequency subchannel data stream or each data substream may be adjusted based on the coding and modulation control signals and the weighting may be performed based on the weights. Each data processor 430 thus provides up to $N_C$ weighted modulation symbol streams for up to $N_C$ spatial subchannels selected for use for the frequency subchannel.

For a MIMO system utilizing OFDM, the modulation symbols may be transmitted on multiple frequency subchannels and from multiple transmit antennas. Within a MIMO processor 320d, the up to $N_C$ modulation symbol streams from each data processor 430 are provided to a respective subchannel spatial processor 432, which processes the received modulation symbols based on the channel control and/or the available CSI. Each spatial processor 432 may simply implement a demultiplexer (such as that shown in FIG. 4A) if full-CSI processing is not performed, or may implement a channel MIMO processor followed by a demultiplexer (such as that shown in FIG. 4B) if full-CSI processing is performed. For a MIMO system utilizing OFDM, the full-CSI processing (i.e., preconditioning) may be performed on each frequency subchannel.

Each subchannel spatial processor 432 demultiplexes the up to $N_C$ modulation symbols for each time slot into up to $N_T$ modulation symbols for the transmit antennas selected for use for that frequency subchannel. For each transmit antenna, a combiner 434 receives the modulation symbols for up to $N_L$ frequency subchannels selected for use for that transmit antenna, combines the symbols for each time slot into a modulation symbol vector V, and provides the modulation symbol vector to the next processing stage (i.e., a respective modulator 322).

MIMO processor 320d thus receives and processes the modulation symbols to provide up to $N_T$ modulation symbol vectors, $V_1$ through $V_{Nt}$, one modulation symbol vector for each transmit antenna selected for use for data transmission. Each modulation symbol vector V covers a single time slot, and each element of the modulation symbol vector V is associated with a specific frequency subchannel having a unique subcarrier on which the modulation symbol is conveyed.

FIG. 4D also shows an embodiment of modulator 322 for OFDM. The modulation symbol vectors $V_1$ through $V_{Nt}$ from MIMO processor 320c are provided to modulators 322a through 322t, respectively. In the embodiment shown in FIG. 4D, each modulator 322 includes an inverse Fast Fourier Transform (IFFT) 440, a cyclic prefix generator 442, and an upconverter 444.

IFFT 440 converts each received modulation symbol vector into its time-domain representation (which is referred to as an OFDM symbol) using IFFT. IFFT 440 can be designed to perform the IFFT on any number of frequency subchannels (e.g., 8, 16, 32, and so on). In an embodiment, for each modulation symbol vector converted to an OFDM symbol, cyclic prefix generator 442 repeats a portion of the time-domain representation of the OFDM symbol to form a "transmission symbol" for a specific transmit antenna. The cyclic prefix insures that the transmission symbol retains its orthogonal properties in the presence of multipath delay spread, thereby improving performance against deleterious path effects. The implementation of IFFT 440 and cyclic prefix generator 442 is known in the art and not described in detail herein.

The time-domain representations from each cyclic prefix generator 442 (i.e., the transmission symbols for each antenna) are then processed (e.g., converted into an analog signal, modulated, amplified, and filtered) by upconverter 444 to generate a modulated signal, which is then transmitted from a respective antenna 324.

OFDM modulation is described in further detail in a paper entitled "Multicarrier Modulation for Data Transmission: An Idea Whose Time Has Come," by John A. C. Bingham, IEEE Communications Magazine, May 1990, which is incorporated herein by reference.

FIGS. 4A through 4D show four designs of a MIMO transmitter capable of implementing various aspects and embodiments of the invention. The invention may also be practiced in an OFDM system that does not utilize MIMO. In this case, the available transmission channels correspond to the frequency subchannels of the OFDM system. Numerous other transmitter designs are also capable of implementing various inventive techniques described herein, and these designs are also within the scope of the invention. Some of these transmitter designs are described in further detail in the following patent applications, which are all assigned to the assignee of the present application and incorporated herein by reference:

U.S. patent application Ser. No. 09/776,075, described above;

U.S. patent application Ser. No. 09/532,492, entitled "HIGH EFFICIENCY, HIGH PERFORMANCE COMMUNICATIONS SYSTEM EMPLOYING MULTI-CARRIER MODULATION," filed Mar. 22, 2000;

U.S. patent application Ser. No. 09/826,481, "METHOD AND APPARATUS FOR UTILIZING CHANNEL STATE INFORMATION IN A WIRELESS COMMUNICATION SYSTEM," filed Mar. 23, 2001; and U.S. patent application Ser. No. 09/854,235, entitled "METHOD AND APPARATUS FOR PROCESSING DATA IN A MULTIPLE-INPUT MULTIPLE-OUTPUT (MIMO) COMMUNICATION SYSTEM UTILIZING CHANNEL STATE INFORMATION," filed May 11, 2001.

These patent applications also describe MIMO processing and CSI processing in further detail.

In general, transmitter system 310 codes and modulates data for all selected transmission channels (or all selected transmission channels within each group) based a particular common coding and modulation scheme. The modulation symbols are further weighted by weights assigned to the selected transmission channels such that the desired level of performance is achieved at the receiver. The techniques described herein are applicable for multiple parallel transmission channels supported by MIMO, OFDM, or any other communication scheme (e.g., a CDMA scheme) capable of supporting multiple parallel transmission channels.

FIG. 4C shows an embodiment wherein the data for each transmit antenna may be coded and modulated separately based on a coding and modulation scheme selected for that transmit antenna. Analogously, FIG. 4D shows an embodiment wherein the data for each frequency subchannel may be coded and modulated separately based on a coding and modulation scheme selected for that frequency subchannel. In general, all available transmission channels (e.g., all spatial subchannels of all frequency subchannels) may be segregated into any number of groups of any type, and each group may include any number of transmission channels. For example, each group may include spatial subchannels, frequency subchannels, or subchannels in both domains.

MIMO Receiver Systems

Figure 5:
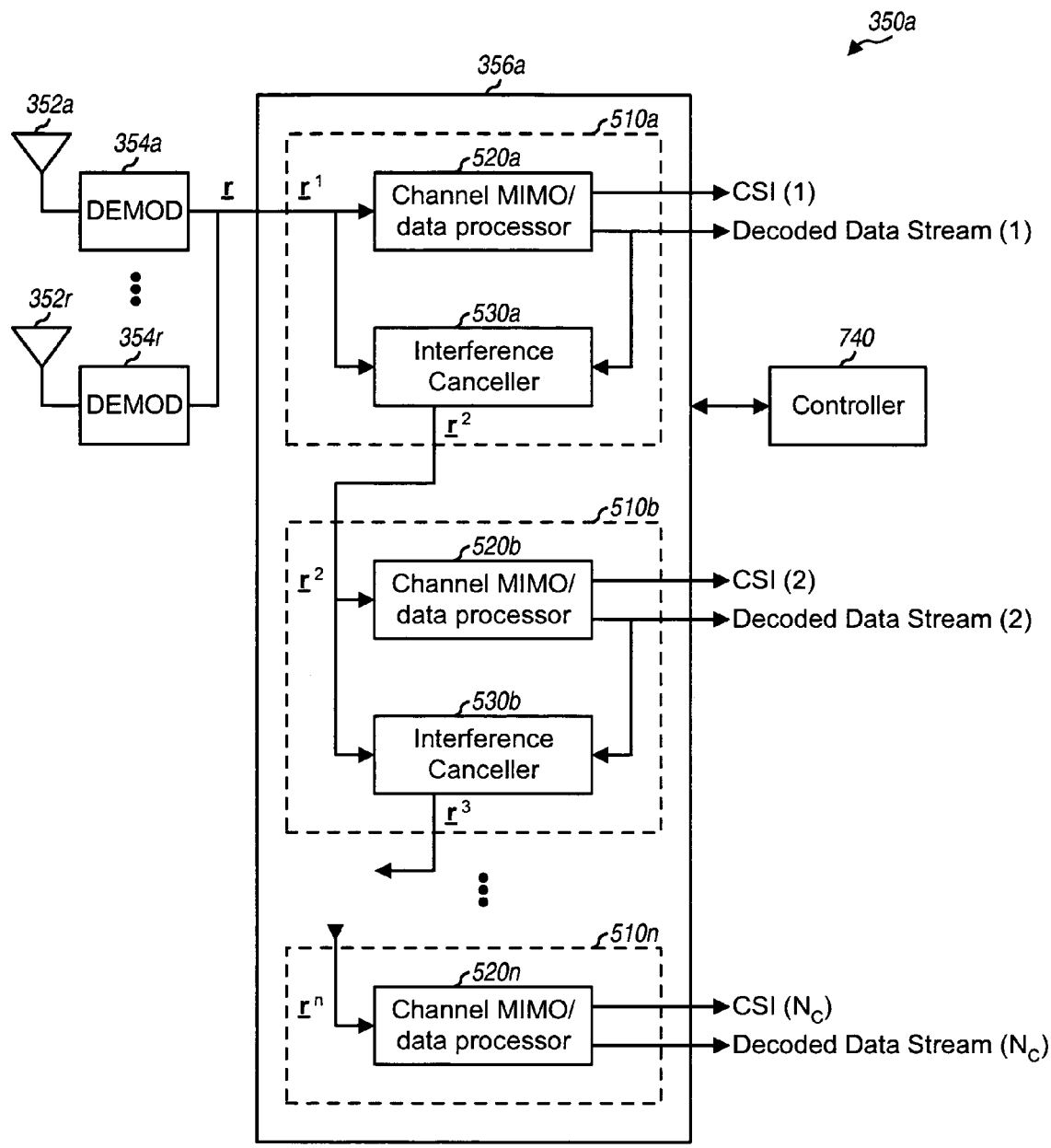
FIG. 5 is a block diagrams of a MIMO receiver system capable of receiving data in accordance with an embodiment of the invention.

FIG. 5 is a block diagram of a MIMO receiver system 350a capable of receiving data in accordance with an embodiment of the invention. Receiver system 350a is one specific embodiment of receiver system 350 in FIG. 3 and implements the successive cancellation receiver processing technique to receive and recover the transmitted signals. The transmitted signals from (up to) $N_T$ transmit antennas are received by each of $N_R$ antennas 352a through 352r and routed to a respective demodulator (DEMOD) 354 (which is also referred to as a front-end processor).

Each demodulator 354 conditions (e.g., filters and amplifies) a respective received signal, downconverts the conditioned signal to an intermediate frequency or baseband, and digitizes the downconverted signal to provide samples. Each demodulator 354 may further demodulate the samples with a received pilot to generate a stream of received modulation symbols, which is provided to an RX channel/data processor 356a.

If OFDM is employed for the data transmission, each demodulator 354 further performs processing complementary to that performed by modulator 322 shown in FIG. 4D. In this case, each demodulator 354 includes an FFT processor (not shown) that generates transformed representations of the samples and provides a stream of modulation symbol vectors. Each vector includes up to $N_L$ modulation symbols for up to $N_L$ frequency subchannels selected for use, and one vector is provided for each time slot. For a transmit processing scheme in which each frequency subchannel is independently processed (e.g., as shown in FIG. 4D), the modulation symbol vector streams from the FFT processors of all $N_R$ demodulators are provided to a demultiplexer (not shown in FIG. 5), which "channelizes" the modulation symbol vector stream from each FFT processor into up to $N_L$ modulation symbol streams corresponding to the number of frequency subchannels used for the data transmission. The demultiplexer then provides each of up to $N_L$ modulation symbol streams to a respective RX MIMO/data processor 356a.

For a MIMO system not utilizing OFDM, one RX MIMO/data processor 356a may be used to process the $N_R$ modulation symbol streams from the $N_R$ received antennas. And for a MIMO system utilizing OFDM, one RX MIMO/data processor 356a may be used to process the set of $N_R$ modulation symbol streams from the $N_R$ received antennas for each of up to $N_L$ frequency subchannels used for data transmission. Alternatively, a single RX channel/data processor 356a may be used to separately process the set of modulation symbol streams associated with each frequency subchannel.

In the embodiment shown in FIG. 5, RX channel/data processor 356a (which is one embodiment of RX channel/data processor 356 in FIG. 3) includes a number of successive (i.e., cascaded) receiver processing stages 510, one stage for each of the transmitted data streams to be recovered by receiver system 350a. In one transmit processing scheme, selective channel inversion is applied to all available transmission channels. In this case, the selected transmission channels may be used to transmit one or more data streams, each of which may be independently coded with the common coding scheme. In another transmit processing scheme, selective channel inversion is applied separately to each transmit antenna. In this case, the selected transmission channels for each transmit antenna may be used to transmit one or more data streams, each of which may be independently coded with the coding scheme selected for that transmit antenna. In general, if one data stream is independently coded and transmitted on each spatial subchannel, then the successive cancellation receiver processing technique may be used to recover the transmitted data streams. For clarity, RX channel/data processor 356a is described for an embodiment wherein one data stream is independently coded and transmitted on each spatial subchannel of a given frequency subchannel being processed data processor 356a.

Each receiver processing stage 510 (except for the last stage 510n) includes a channel MIMO/data processor 520 coupled to an interference canceller 530, and the last stage 510n includes only channel MIMO/data processor 520n. For the first receiver processing stage 510a, channel MIMO/data processor 520a receives and processes the $N_R$ modulation symbol streams from demodulators 354a through 354r to provide a decoded data stream for the first transmission channel (or the first transmitted signal). And for each of the second through last stages 510b through 510n, channel MIMO/data processor 520 for that stage receives and processes the $N_R$ modified symbol streams from the interference canceller 520 in the preceding stage to derive a decoded data stream for the transmission channel being processed by that stage. Each channel MIMO/data processor 520 further provides CSI (e.g., the received SNR) for the associated transmission channel.

For the first receiver processing stage 510a, interference canceller 530a receives the $N_R$ modulation symbol streams from all $N_R$ demodulators 354. And for each of the second through second-to-last stages, interference canceller 530 receives the $N_R$ modified symbol streams from the interference canceller in the preceding stage. Each interference canceller 530 also receives the decoded data stream from channel MIMO/data processor 520 within the same stage, and performs the processing (e.g., coding, interleaving, modulation, channel response, and so on) to derive $N_R$ remodulated symbol streams that are estimates of the interference components of the received modulation symbol streams due to this decoded data stream. The remodulated symbol streams are then subtracted from the received modulation symbol streams to derive $N_R$ modified symbol streams that include all but the subtracted (i.e., canceled) interference components. The $N_R$ modified symbol streams are then provided to the next stage.

In FIG. 5, a controller 540 is shown coupled to RX channel/data processor 356a and may be used to direct various steps in the successive cancellation receiver processing performed by processor 356a.

FIG. 5 shows a receiver structure that may be used in a straightforward manner when each data stream is transmitted over a respective transmit antenna (i.e., one data stream corresponding to each transmitted signal). In this case, each receiver processing stage 510 may be operated to recover one of the transmitted signals targeted for receiver system 350a and provide the decoded data stream corresponding to the recovered transmitted signal.

For some other transmit processing schemes, a data stream may be transmitted over multiple transmit antennas, frequency subchannels, and/or time intervals to provide spatial, frequency, and time diversity, respectively. For these schemes, the receiver processing initially derives a received modulation symbol stream for the signal transmitted on each transmit antenna of each frequency subchannel. Modulation symbols for multiple transmit antennas, frequency subchannels, and/or time intervals may then be combined in a complementary manner as the demultiplexing performed at the transmitter system. The stream of combined modulation symbols is then processed to provide the corresponding decoded data stream.

Figure 6A:
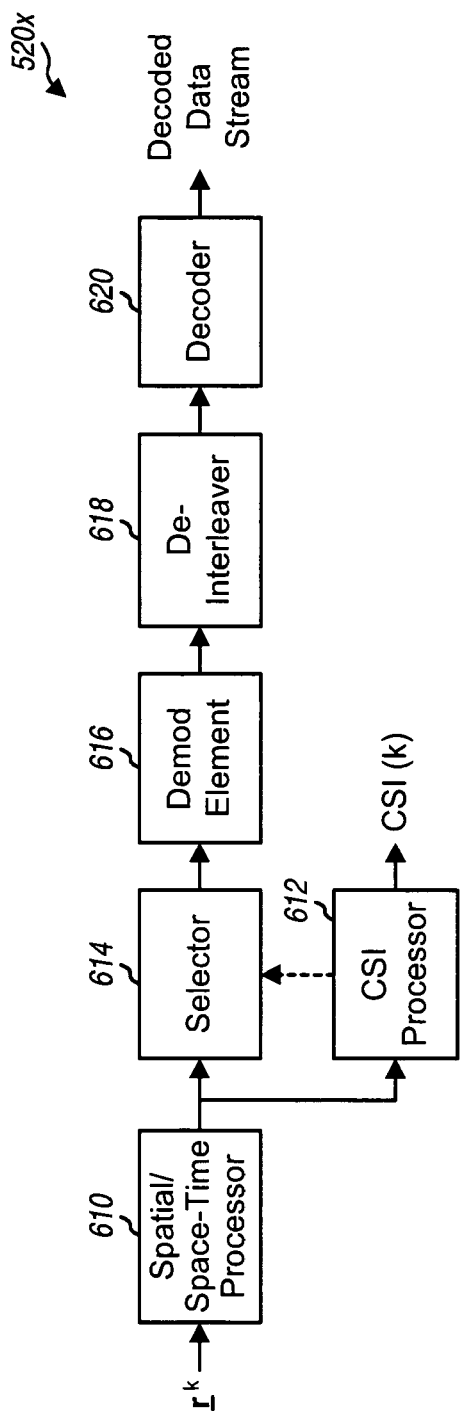
FIGS. 6A and 6B are block diagrams of an embodiment of a channel MIMO/data processor and an interference canceller, respectively, within the MIMO receiver system shown in FIG. 5.

FIG. 6A is a block diagram of an embodiment of channel MIMO/data processor 520x, which is one embodiment of channel MIMO/data processor 520 in FIG. 5. In this embodiment, channel MIMO/data processor 520x includes a spatial/space-time processor 610, a CSI processor 612, a selector 614, a demodulation element 618, a de-interleaver 618, and a decoder 620.

Spatial/space-time processor 610 performs linear spatial processing on the $N_R$ received signals for a non-dispersive MIMO channel (i.e., with flat fading) or space-time processing on the $N_R$ received signals for a dispersive MIMO channel (i.e., with frequency selective fading). The spatial processing may be achieved using linear spatial processing techniques such as a channel correlation matrix inversion (CCMI) technique, a minimum mean square error (MMSE) technique, and others. These techniques may be used to null out the undesired signals or to maximize the received SNR of each of the constituent signals in the presence of noise and interference from the other signals. The space-time processing may be achieved using linear space-time processing techniques such as a MMSE linear equalizer (MMSE-LE), a decision feedback equalizer (DFE), a maximum-likelihood sequence estimator (MLSE), and others. The CCMI, MMSE, MMSE-LE, and DFE techniques are described in further detail in the aforementioned U.S. patent application Ser. No. 09/854,235. The DFE and MLSE techniques are also described in further detail by S. L. Ariyavistakul et al. in a paper entitled "Optimum Space-Time Processors with Dispersive Interference: Unified Analysis and Required Filter Span," IEEE Trans. on Communication, Vol. 7, No. 7, Jul. 1999, and incorporated herein by reference.

CSI processor 612 determines the CSI for each of the transmission channels used for data transmission. For example, CSI processor 612 may estimate a noise covariance matrix based on the received pilot signals and then compute the SNR of the k-th transmission channel used for the data stream to be decoded. The SNR may be estimated similar to conventional pilot assisted single and multi-carrier systems, as is known in the art. The SNR for all of the transmission channels used for data transmission may comprise the CSI that is reported back to the transmitter system. CSI processor 612 may further provide to selector 614 a control signal that identifies the particular data stream to be recovered by this receiver processing stage.

Selector 614 receives a number of symbol streams from spatial/space-time processor 610 and extracts the symbol stream corresponding to the data stream to be decoded, as indicated by the control signal from CSI processor 612. The extracted stream of modulation symbols is then provided to a demodulation element 614.

For the embodiment shown in FIG. 6A in which the data stream for each transmission channel is independently coded and modulated based on the common coding and modulation scheme, the recovered modulation symbols for the selected transmission channel are demodulated in accordance with a demodulation scheme (e.g., M-PSK, M-QAM) that is complementary to the common modulation scheme used for the transmission channel. The demodulated data from demodulation element 616 is then de-interleaved by a de-interleaver 618 in a complementary manner to that performed by channel interleaver 614, and the de-interleaved data is further decoded by a decoder 620 in a complementary manner to that performed by encoder 612. For example, a Turbo decoder or a Viterbi decoder may be used for decoder 620 if Turbo or convolutional coding, respectively, is performed at the transmitter system. The decoded data stream from decoder 620 represents an estimate of the transmitted data stream being recovered.

Figure 6B:
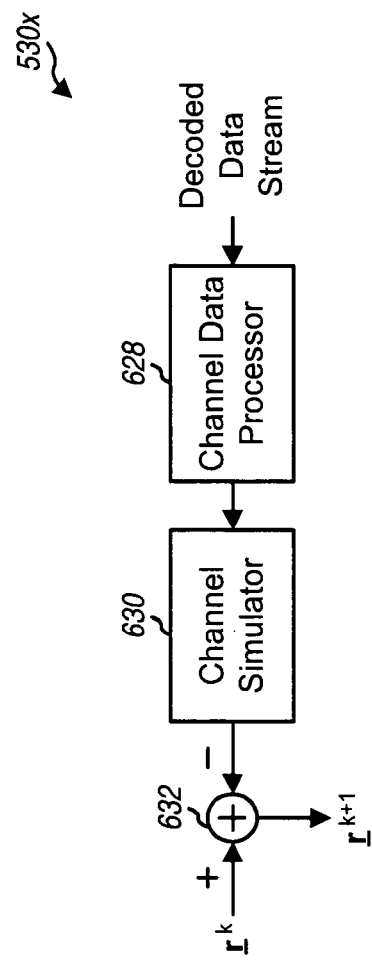

FIG. 6B is a block diagram of an interference canceller 530x, which is one embodiment of interference canceller 530 in FIG. 5. Within interference canceller 530x, the decoded data stream from the channel MIMO/data processor 520 within the same stage is re-encoded, interleaved, and re-modulated by a channel data processor 628 to provide remodulated symbols, which are estimates of the modulation symbols at the transmitter system prior to the MIMO processing and channel distortion. Channel data processor 628 performs the same processing (e.g., encoding, interleaving, and modulation) as that performed at the transmitter system for the data stream. The remodulated symbols are then provided to a channel simulator 630, which processes the symbols with the estimated channel response to provide an estimate, $\hat{i}^k$, of the interference due the decoded data stream. The channel response estimate may be derived based on the pilot and/or data transmitted by the transmitter system and in accordance with the techniques described in the aforementioned U.S. patent application Ser. No. 09/854,235.

The $N_R$ elements in the interference vector $\hat{i}^k$ correspond to the component of the received signal at each of the $N_R$ receive antennas due to symbol stream transmitted on the k-th transmit antenna. Each element of the vector represents an estimated component due to the decoded data stream in the corresponding received modulation symbol stream. These components are interference to the remaining (not yet detected) transmitted signals in the $N_R$ received modulation symbol streams (i.e., the vector $r^k$), and are subtracted (i.e., canceled) from the received signal vector $r^k$ by a summer 632 to provide a modified vector $r^{k+1}$ having the components from the decoded data stream removed. The modified vector $r^{k+1}$ is provided as the input vector to the next receiver processing stage, as shown in FIG. 5.

Various aspects of the successive cancellation receiver processing are described in further detail in the aforementioned U.S. patent application Ser. No. 09/854,235.

Figure 7:
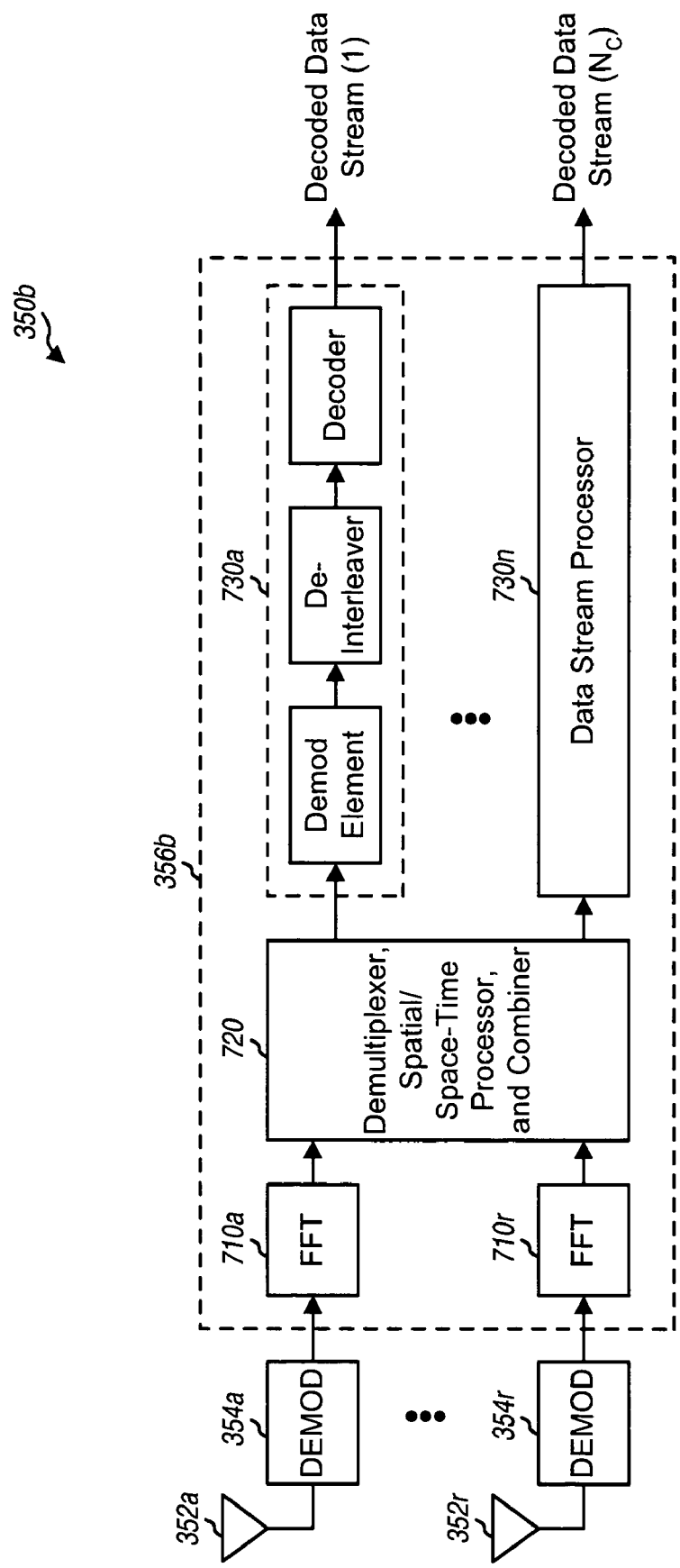
FIG. 7 is a block diagram of a MIMO receiver system capable of receiving data in accordance with another embodiment of the invention.

FIG. 7 is a block diagram of a MIMO receiver system 350b capable of receiving data in accordance with another embodiment of the invention. The transmitted signals from (up to) $N_T$ transmit antennas are received by each of $N_R$ antennas 352a through 352r and routed to a respective demodulator 354. Each demodulator 354 conditions, processes, and digitizes a respective received signal to provide samples, which are provided to a RX MIMO/data processor 356b.

Within RX MIMO/data processor 356b, the samples for each receive antenna are provided to a respective FFT processor 710, which generates transformed representations of the received samples and provides a respective stream of modulation symbol vectors. The streams of modulation symbol vector from FFT processors 710a through 710r are then provided to a processor 720. Processor 720 channelizes the stream of modulation symbol vectors from each FFT processor 710 into a number of up to $N_L$ subchannel symbol streams. Processor 720 may further perform spatial processing or space-time processing on the subchannel symbol streams to provide post-processed modulation symbols.

For each data stream transmitted over multiple frequency subchannels and/or multiple spatial subchannels, processor 720 further combines the modulation symbols for all frequency and spatial subchannels used for transmitting the data stream into one post-processed modulation symbol stream, which is then provided to a data stream processor 730. Each data stream processor 730 performs demodulation, de-interleaving, and decoding complementary to that performed on the data stream at the transmitter unit and provides a respective decoded data stream.

Receiver systems that employ the successive cancellation receiver processing technique and those that do not employ the successive cancellation receiver processing technique may be used to receive, process, and recover the transmitted data streams. Some receiver systems capable of processing signals received over multiple transmission channels are described in the aforementioned U.S. patent application Ser. Nos. 09/776,075 and 09/826,481, and U.S. patent application Ser. No. 09/532,492, entitled "HIGH EFFICIENCY, HIGH PERFORMANCE COMMUNICATIONS SYSTEM EMPLOYING MULTI-CARRIER MODULATION," filed Mar. 30, 2000, assigned to the assignee of the present invention and incorporated herein by reference.

Obtaining CSI for the Transmitter System

For simplicity, various aspects and embodiments of the invention have been described wherein the CSI comprises SNR. In general, the CSI may comprise any type of information that is indicative of the characteristics of the communication link. Various types of information may be provided as CSI, some examples of which are described below.

In one embodiment, the CSI comprises SNR, which is derived as the ratio of the signal power over the noise plus interference power. The SNR is typically estimated and provided for each transmission channel used for data transmission (e.g., each transmit data stream), although an aggregate SNR may also be provided for a number of transmission channels. The SNR estimate may be quantized to a value having a particular number of bits. In one embodiment, the SNR estimate is mapped to an SNR index, e.g., using a look-up table.

In another embodiment, the CSI comprises power control information for each spatial subchannel of each frequency subchannel. The power control information may include a single bit for each transmission channel to indicate a request for either more power or less power, or it may include multiple bits to indicate the magnitude of the change of power level requested. In this embodiment, the transmitter system may make use of the power control information fed back from the receiver systems to determine which transmission channels to select, and what power to use for each transmission channel.

In yet another embodiment, the CSI comprises signal power and interference plus noise power. These two components may be separately derived and provided for each transmission channel used for data transmission.

In yet another embodiment, the CSI comprises signal power, interference power, and noise power. These three components may be derived and provided for each transmission channel used for data transmission.

In yet another embodiment, the CSI comprises signal-to-noise ratio plus a list of interference powers for each observable interference term. This information may be derived and provided for each transmission channel used for data transmission.

In yet another embodiment, the CSI comprises signal components in a matrix form (e.g., $N_T \times N_R$ complex entries for all transmit-receive antenna pairs) and the noise plus interference components in matrix form (e.g., $N_T \times N_R$ complex entries). The transmitter system may then properly combine the signal components and the noise plus interference components for the appropriate transmit-receive antenna pairs to derive the quality for each transmission channel used for data transmission (e.g., the post-processed SNR for each transmitted data stream, as received at the receiver systems).

In yet another embodiment, the CSI comprises a data rate indicator for each transmit data stream. The quality of a transmission channel to be used for data transmission may be determined initially (e.g., based on the SNR estimated for the transmission channel) and a data rate corresponding to the determined channel quality may then be identified (e.g., based on a look-up table). The identified data rate is indicative of the maximum data rate that may be transmitted on the transmission channel for the required level of performance. The data rate is then mapped to and represented by a data rate indicator (DRI), which can be efficiently coded. For example, if (up to) seven possible data rates are supported by the transmitter system for each transmit antenna, then a 3-bit value may be used to represent the DRI where, e.g., a zero may indicate a data rate of zero (i.e., don't use the transmit antenna) and 1 through 7 may be used to indicate seven different data rates. In a typical implementation, the quality measurements (e.g., SNR estimates) are mapped directly to the DRI based on, e.g., a look-up table.

In yet another embodiment, the CSI comprises an indication of the particular processing scheme to be used at the transmitter system for each transmit data stream. In this embodiment, the indicator may identify the particular coding scheme and the particular modulation scheme to be used for the transmit data stream such that the desired level of performance is achieved.

In yet another embodiment, the CSI comprises a differential indicator for a particular measure of quality for a transmission channel. Initially, the SNR or DRI or some other quality measurement for the transmission channel is determined and reported as a reference measurement value. Thereafter, monitoring of the quality of the transmission channel continues, and the difference between the last reported measurement and the current measurement is determined. The difference may then be quantized to one or more bits, and the quantized difference is mapped to and represented by the differential indicator, which is then reported. The differential indicator may indicate to increase or decrease the last reported measurement by a particular step size (or to maintain the last reported measurement). For example, the differential indicator may indicate that (1) the observed SNR for a particular transmission channel has increased or decreased by a particular step size, or (2) the data rate should be adjusted by a particular amount, or some other change. The reference measurement may be transmitted periodically to ensure that errors in the differential indicators and/or erroneous reception of these indicators do not accumulate.

In yet another embodiment, the CSI comprises the channel gain for each available transmission channel, as estimated at the receiver system based on signals transmitted by the transmitter system.

Other forms of CSI may also be used and are within the scope of the invention. In general, the CSI includes sufficient information in whatever form that may be used to (1) select a set of transmission channels that will result in optimum or near optimum throughput, (2) determine a weighting factor for each selected transmission channel that results in equal or near equal received SNRs, and (3) infer an optimum or near optimum code rate for the selected transmission channels.

The CSI may be derived based on the signals transmitted from the transmitter system and received at the receiver systems. In an embodiment, the CSI is derived based on a pilot reference included in the transmitted signals. Alternatively or additionally, the CSI may be derived based on the data included in the transmitted signals. Although data may be transmitted on only the selected transmission channels, pilot data may be transmitted on unselected transmission channels to allow the receiver systems to estimate the channel characteristics.

In yet another embodiment, the CSI comprises one or more signals transmitted from the receiver systems to the transmitter system. In some systems, a degree of correlation may exist between the uplink and downlink (e.g. time division duplexed (TDD) systems where the uplink and downlink share the same frequency band in a time division multiplexed manner). In these systems, the quality of the uplink may be estimated (to a requisite degree of accuracy) based on the quality of the downlink, and vice versa, which may be estimated based on signals (e.g., pilot signals) transmitted from the receiver systems. The pilot signals would then represent a means for which the transmitter system could estimate the CSI as observed at the receiver systems. For this type of CSI, no reporting of channel characteristics is necessary.

The signal quality may be estimated at the transmitter system based on various techniques. Some of these techniques are described in the following patents, which are assigned to the assignee of the present application and incorporated herein by reference:

U.S. Pat. No. 5,799,005, entitled "SYSTEM AND METHOD FOR DETERMINING RECEIVED PILOT POWER AND PATH LOSS IN A CDMA COMMUNICATION SYSTEM," issued Aug. 25, 1998, U.S. Pat. No. 5,903,554, entitled "METHOD AND APPARATUS FOR MEASURING LINK QUALITY IN A SPREAD SPECTRUM COMMUNICATION SYSTEM," issued May 11, 1999, U.S. Pat. Nos. 5,056,109, and 5,265,119, both entitled "METHOD AND APPARATUS FOR CONTROLLING TRANSMISSION POWER IN A CDMA CELLULAR MOBILE TELEPHONE SYSTEM," respectively issued Oct. 8, 1991 and Nov. 23, 1993, and U.S. Pat. No. 6,097,972, entitled "METHOD AND APPARATUS FOR PROCESSING POWER CONTROL SIGNALS IN CDMA MOBILE TELEPHONE SYSTEM," issued Aug. 1, 2000.

Methods for estimating a single transmission channel based on a pilot signal or a data transmission may also be found in a number of papers available in the art. One such channel estimation method is described by F. Ling in a paper entitled "Optimal Reception, Performance Bound, and Cutoff-Rate Analysis of References-Assisted Coherent CDMA Communications with Applications," IEEE Transaction On Communication, Oct. 1999.

Various types of information for CSI and various CSI reporting mechanisms are also described in U.S. patent application Ser. No. 08/963,386, entitled "METHOD AND APPARATUS FOR HIGH RATE PACKET DATA TRANSMISSION," filed Nov. 3, 1997, assigned to the assignee of the present application, and in "TIE/EIA/IS-856 cdma2000 High Rate Packet Data Air Interface Specification", both of which are incorporated herein by reference.

The CSI may be reported back to the transmitter using various CSI transmission schemes. For example, the CSI may be sent in full, differentially, or a combination thereof. In one embodiment, CSI is reported periodically, and differential updates are sent based on the prior transmitted CSI. In another embodiment, the CSI is sent only when there is a change (e.g., if the change exceeds a particular threshold), which may lower the effective rate of the feedback channel. As an example, the SNRs may be sent back (e.g., differentially) only when they change. For an OFDM system (with or without MIMO), correlation in the frequency domain may be exploited to permit reduction in the amount of CSI to be fed back. As an example for an OFDM system, if the SNR corresponding to a particular spatial subchannel for M frequency subchannels is the same, the SNR and the first and last frequency subchannels for which this condition is true may be reported. Other compression and feedback channel error recovery techniques to reduce the amount of data to be fed back for CSI may also be used and are within the scope of the invention.

Referring back to FIG. 3, the CSI (e.g., the received SNR) determined by RX channel/data processor 356 is provided to a TX data processor 362, which processes the CSI and provides processed data to one or more modulators 354. Modulators 354 further condition the processed data and transmit the CSI back to transmitter system 310 via a reverse channel.

At system 310, the transmitted feedback signal is received by antennas 324, demodulated by demodulators 322, and provided to a RX data processor 332. RX data processor 332 performs processing complementary to that performed by TX data processor 362 and recovers the reported CSI, which is then provided to controller 334.

Controller 334 uses the reported CSI to perform a number of functions including (1) selecting the set of $N_S$ best available transmission channels for data transmission, (2) determining the coding and modulation scheme to be used for data transmission on the selected transmission channels, and (3) determining the weights to be used for the selected transmission channels. Controller 334 may select the transmission channels to achieve high throughput or based on some other performance criteria or metrics, and may further determine the threshold used to select the transmission channels, as described above.

The characteristics (e.g., channel gains or received SNRs) of the transmission channels available for data transmission may be determined based on various techniques as described above and provided to the transmitter system. The transmitter system may then use the information to select the set of $N_S$ best transmission channels, properly code and modulate the data, and further weight the modulation symbols.

The techniques described herein may be used for data transmission on the downlink from a base station to one or more terminals, and may also be used for data transmission on the uplink from each of one or more terminals to a base station. For the downlink, transmitter system 310 in FIGS. 3 and 4A through 4D may represent part of a base station and receiver system 350 in FIGS. 3, 5, and 6 may represent part of a terminal. And for the uplink, transmitter system 310 in FIGS. 3 and 4A through 4D may represent part of a terminal and receiver system 350 in FIGS. 3, 5, and 6 may represent part of a base station.

The elements of the transmitter and receiver systems may be implemented with one or more digital signal processors (DSP), application specific integrated circuits (ASIC), processors, microprocessors, controllers, microcontrollers, field programmable gate arrays (FPGA), programmable logic devices, other electronic units, or any combination thereof. Some of the functions and processing described herein may also be implemented with software executed on a processor. Certain aspects of the invention may also be implemented with a combination of software and hardware. For example, computations to determine the threshold, $\alpha$, and to select transmission channels may be performed based on program codes executed on a processor (controller 334 in FIG. 3).

Headings are included herein for reference and to aid in the locating certain sections. These heading are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transmitting data by a transmitter over multiple transmission channels to a receiver in a multi-channel communication system, comprising:
   selecting one or more available transmission channels from each of a plurality of groups of transmission channels for use for data transmission;
   coding and modulating data for transmission over the selected transmission channels in each of the plurality of groups of transmission channels to provide modulation symbols;
   weighting modulation symbols for each selected transmission channel in each group based on a respective weight indicative of a transmit power level for the transmission channel and derived based in part on the characteristics of the transmission channel; and
   transmitting the weighted modulation symbols on the selected transmission channels.

2. The method of claim 1, wherein the multi-channel communication system is a multiple-input multiple-output (MIMO) that utilizes orthogonal frequency division modulation (OFDM).

3. The method of claim 1, wherein each group corresponds to a respective transmit antenna.

4. The method of claim 1, wherein the plurality of transmission channels in each group correspond to a plurality of frequency subchannels for a corresponding transmit antenna.

5. The method of claim 1, wherein coding and modulating comprises coding and modulating the data for the selected transmission channels in each group based on a common coding scheme.

6. The method of claim 5, wherein the common coding scheme is selected from among a plurality of possible coding schemes.

7. The method of claim 1, wherein selecting comprises selecting one or more of the available transmission channels in each group for use for data transmission based on the characteristics of the transmission channels and a threshold.

8. The method of claim 7, wherein each group is associated with a respective threshold.

9. The method of claim 1, further comprising deriving the weights for the transmission channels in each group to distribute total transmit power available for the group among all selected transmission channels in the group to achieve similar received signal quality.

10. The method of claim 9, wherein the received signal quality is a function of a signal-to-noise-plus-interference ratio (SNR).

11. The method of claim 1, wherein the characteristics for the available transmission channels are channel gains.

12. The method of claim 1, wherein the characteristics for the available transmission channels are received signal-to-noise-plus-interference ratios (SNRs).

13. The method of claim 1, further comprising deriving the weights for the transmission channels in each group based on a total transmit power available for the group in which the transmission channel belongs.

14. The method of claim 1, further comprising deriving the weight for each selected transmission channel based on a normalization factor, which is determined based on the characteristics of the selected transmission channels.

15. The method of claim 1, further comprising determining the characteristics of the transmission channel based upon channel state information received from an intended receiver of the weighted modulation symbols.

16. The method of claim 15, wherein the channel state information comprises information indicative of a signal-to-noise-plus-interference ratio (SNR).

17. The method of claim 15, wherein the multiple transmission channels each comprise a propagation path between each transmit-receive antenna pair for a plurality of frequency subchannels and wherein the channel state information comprises a characterization of each transmission channel of the multiple transmission channels.

18. A transmitter for use in a multi-channel communication system, comprising:
   a controller configured to select one or more available transmission channels from each of a plurality of groups of transmission channels for use for data transmission;
   a transmit data processor coupled to the controller and configured to code and modulate data for transmission over the selected transmission channels in each of the plurality of groups of transmission channels to provide modulation symbols and to weight the modulation symbols for each selected transmission channel in each group based on a respective weight indicative of a transmit power level for the transmission channel and derived based in part on the characteristics of the transmission channel; and
   a memory coupled with the processor.

19. The transmitter of claim 18, wherein the multi-channel communication system is a multiple-input multiple-output (MIMO) that utilizes orthogonal frequency division modulation (OFDM).

20. The transmitter of claim 18, wherein each group corresponds to a respective transmit antenna of the wireless communication device.

21. The transmitter of claim 18, wherein the plurality of transmission channels in each group correspond to a plurality of frequency subchannels for a corresponding transmit antenna.

22. The transmitter of claim 18, wherein the transmit data processor-is configured to code and modulate the data for the selected transmission channels in each group based on a common coding scheme.

23. The transmitter of claim 18, further comprising a controller coupled with the processor and configured to derive the weights for the transmission channels in each group to distribute total transmit power available for the group among all selected transmission channels in the group to achieve similar received signal quality.

24. The transmitter of claim 23, wherein the received signal quality is a function of a signal-to-noise-plus-interference ratio (SNR).

25. The transmitter of claim 18, wherein the characteristics for the available transmission channels are channel gains.

26. The transmitter of claim 18, wherein the characteristics for the available transmission channels are received signal-to-noise-plus-interference ratios (SNRs).

27. The transmitter of claim 18, further comprising a controller coupled with the processor and configured to derive the weights for the transmission channels in each group based on a total transmit power available for the group in which the transmission channel belongs.

28. The transmitter of claim 18, further comprising a controller coupled with the processor and configured to derive the weight for each selected transmission channel based on a normalization factor, which is determined based on the characteristics of the selected transmission channels.

29. The transmitter of claim 18, further comprising a controller coupled with the processor and configured to determine the characteristics of the transmission channel based upon channel state information received from an intended receiver of the weighted modulation symbols.

30. The transmitter of claim 18, wherein the channel state information comprises information indicative of a signal-to-noise-plus-interference ratio (SNR).

31. The transmitter of claim 18, wherein the multiple transmission channels each comprise a propagation path between each transmit-receive antenna pair for a plurality of frequency subchannels and wherein the channel state information comprises a characterization of each transmission channel of the multiple transmission channels.

32. The transmitter of claim 18, wherein the transmitter comprises a transmitter of an access point.

33. The transmitter of claim 18, wherein the transmitter comprises a transmitter of an access terminal.

34. An apparatus for processing data for transmission over multiple transmission channels in a multi-channel communication system, comprising:
  means for selecting one or more available transmission channels from each of a plurality of groups of transmission channels for data transmission;
  means for coding and modulating data for transmission over the selected transmission channels in each of the plurality of groups of transmission channels to provide modulation symbols;
  means for weighting modulation symbols for each selected transmission channel in each group based on a respective weight indicative of a transmit power level for the transmission channel and derived based in part on the characteristics of the transmission channel; and
  a transmitter configured to transmit the weighted modulation symbols on the selected transmission channels.

35. The apparatus of claim 34, wherein the multi-channel communication system is a multiple-input multiple-output (MIMO) that utilizes orthogonal frequency division modulation (OPDM).

36. The apparatus of claim 34, wherein each group corresponds to a respective transmit antenna.

37. The apparatus of claim 34, wherein the plurality of transmission channels in each group correspond to a plurality of frequency subchannels for a corresponding transmit antenna.

38. The apparatus of claim 34, wherein the means for coding and modulating comprises means for coding and modulating the data for the selected transmission channels in each group based on a common coding scheme.

39. The apparatus of claim 34, further comprising means for deriving the weights for the transmission channels in each group to distribute total transmit power available for the group among all selected transmission channels in the group to achieve similar received signal quality.

40. The apparatus of claim 34, wherein the characteristics for the available transmission channels are channel gains.

41. The apparatus of claim 34, wherein the characteristics for the available transmission channels are received signal-to-noise-plus-interference ratios (SNRs).

42. The apparatus of claim 34, further comprising means for deriving the weights for the transmission channels in each group based on a total transmit power available for the group in which the transmission channel belongs.

43. The apparatus of claim 34, further comprising means for deriving the weight for each selected transmission channel based on a normalization factor, which is determined based on the characteristics of the selected transmission channels.

44. The apparatus of claim 34, further comprising means for determining the characteristics of the transmission channel based upon channel state information received from an intended receiver of the weighted modulation symbols.

45. A processor readable media comprising instructions thereon that may be utilized by a processor for processing data for transmission over multiple transmission channels in a multi-channel communication system, the instructions comprising:
  instructions for selecting one or more available transmission channels from each of a plurality of groups of transmission channels for use for data transmission;
  instructions for coding and modulating data for transmission over the selected transmission channels in each of the plurality of groups of transmission channels to provide modulation symbols; and
  instructions for weighting modulation symbols for each selected transmission channel in each group based on a respective weight indicative of a transmit power level for the transmission channel and derived based in part on the characteristics of the transmission channel.

\* \* \* \* \*

UNITED STATES PATENT AND TRADEMARK OFFICE
CERTIFICATE OF CORRECTION

PATENT NO. : 7,649,954 B2  Page 1 of 1
APPLICATION NO. : 11/478878
DATED : January 19, 2010
INVENTOR(S) : Walton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 50 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,649,954 B2
APPLICATION NO. : 11/478878
DATED : January 19, 2010
INVENTOR(S) : Walton et al.

Page 1 of 1

It is certified that error appears in the above-identified patent and that said Letters Patent is hereby corrected as shown below:

Column 34, line 48, claim 22: "processor-is" to read as --processor is--

Column 35, line 46, claim 35: "(OPDM)" to read as --(OFDM)--

Signed and Sealed this
Tenth Day of May, 2011

David J. Kappos
*Director of the United States Patent and Trademark Office*